Figure 4:
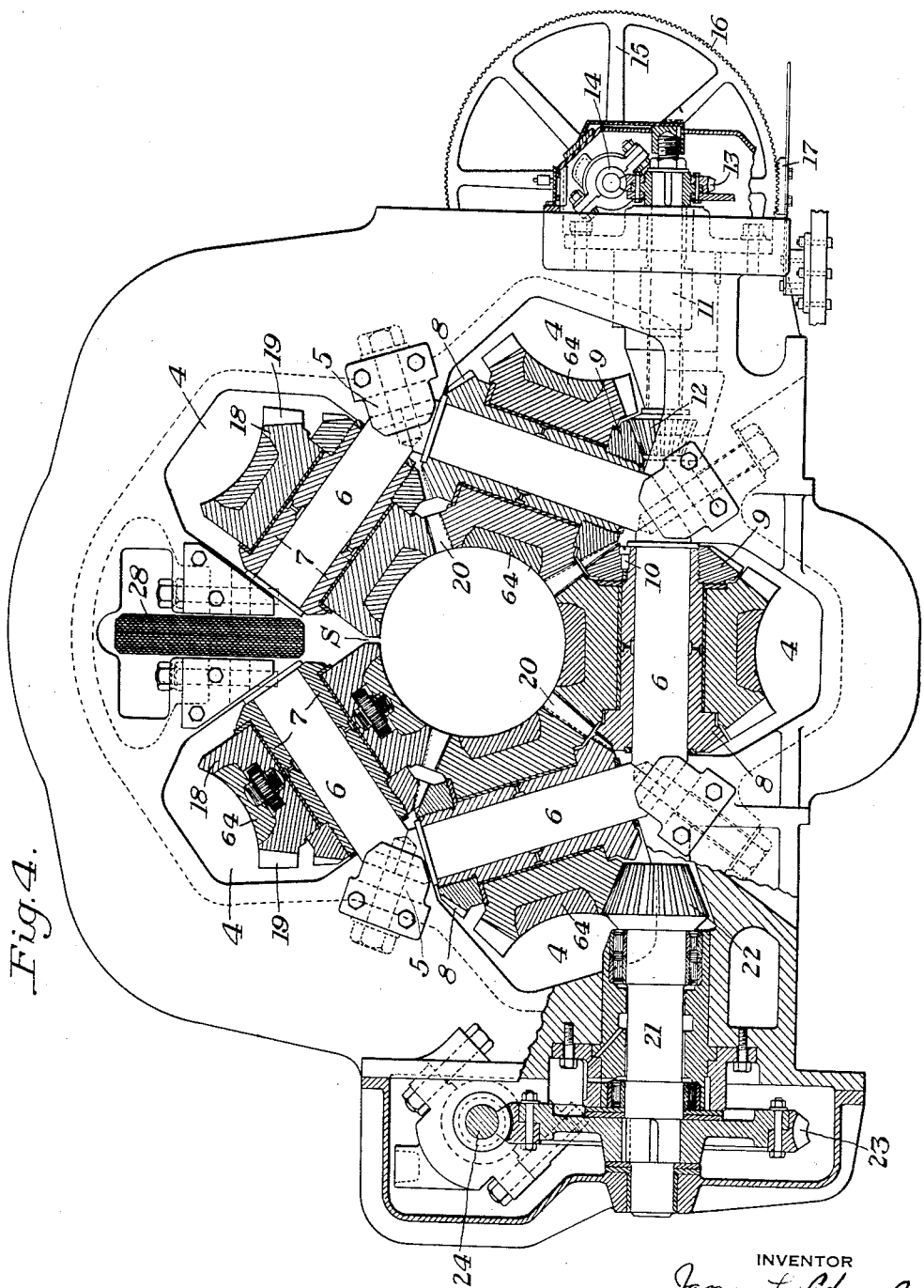

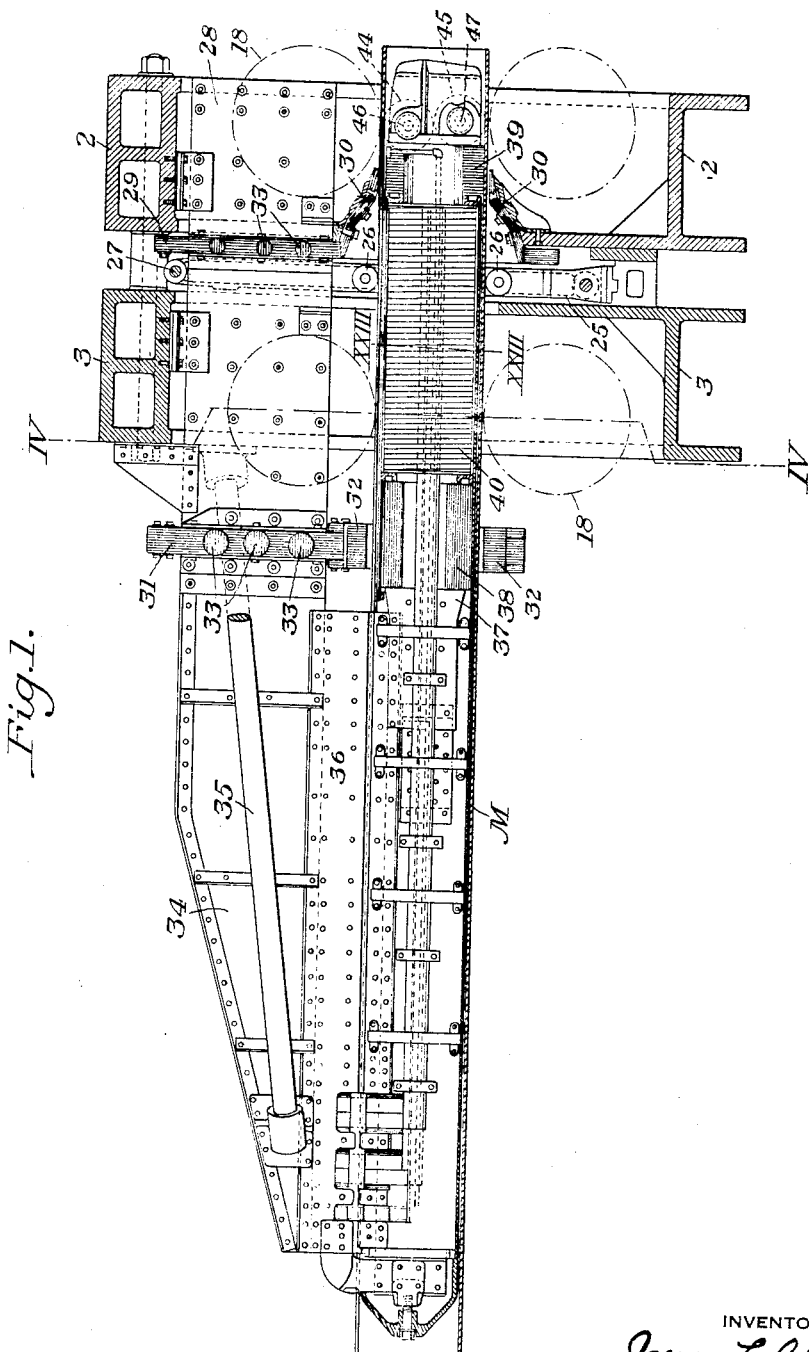

Dec. 7, 1943. J. L. ADAMS, JR 2,335,894
WELDING APPARATUS AND METHOD OF WELDING
Filed May 20, 1930 13 Sheets-Sheet 2
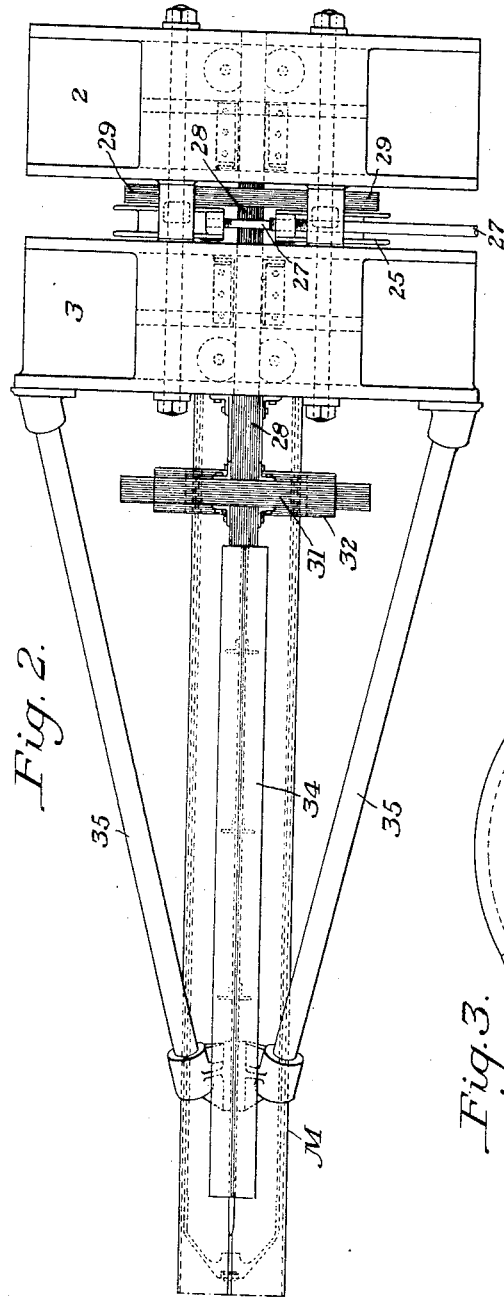
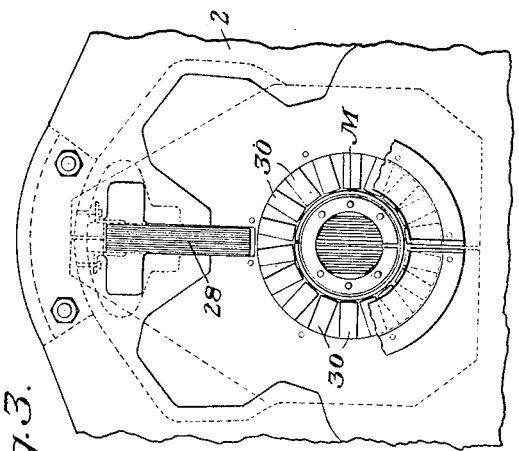
INVENTOR
James L. Adams, Jr.
by his attorneys
Byrnes, Stebbins, Parmelee & Brenko Dec. 7, 1943.   J. L. ADAMS, JR   2,335,894
WELDING APPARATUS AND METHOD OF WELDING
Filed May 20, 1930   13 Sheets-Sheet 3

INVENTOR
James L. Adams, Jr.
by his attorneys
Byrnes, Stebbins, Parmelee & Blenko

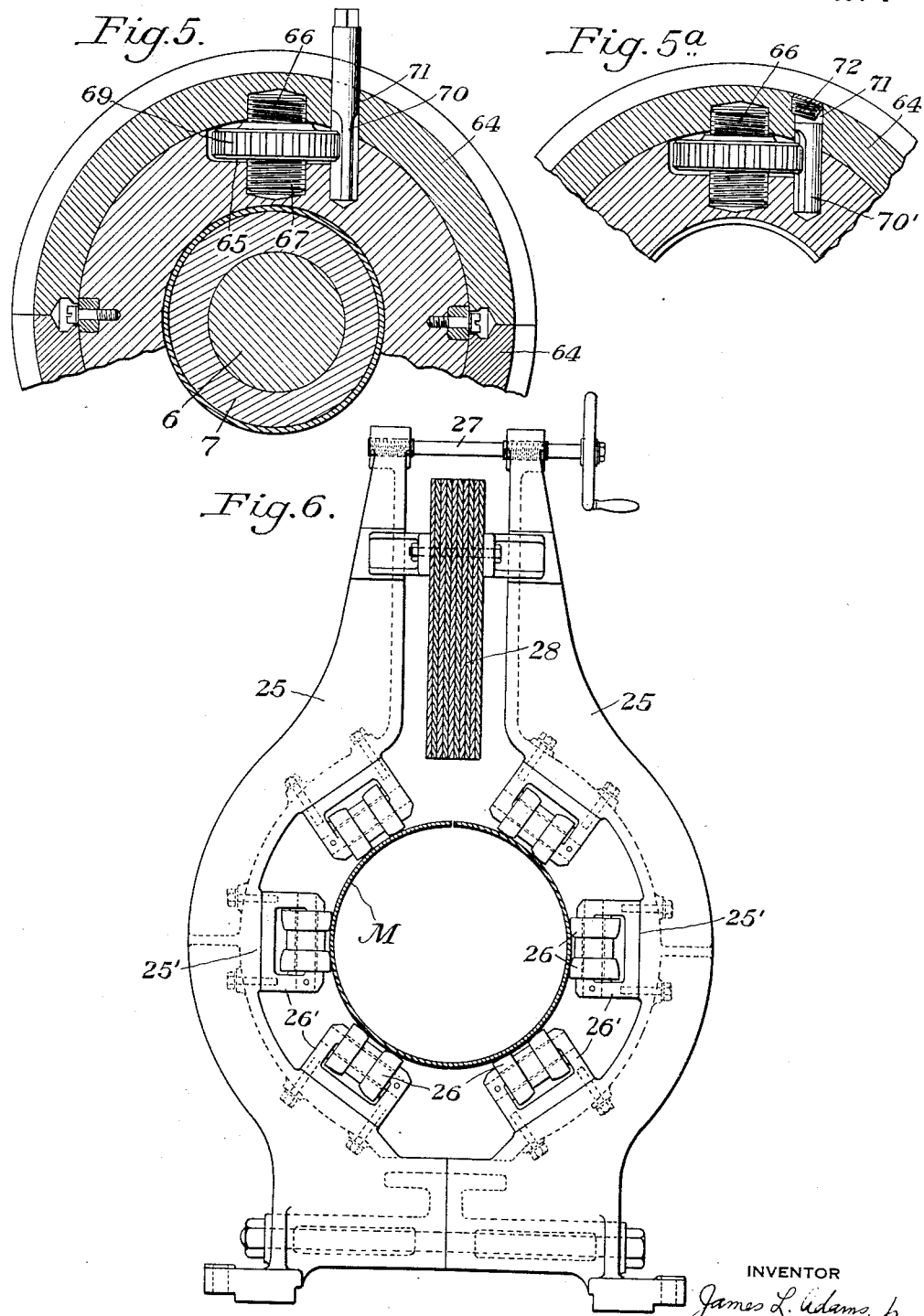

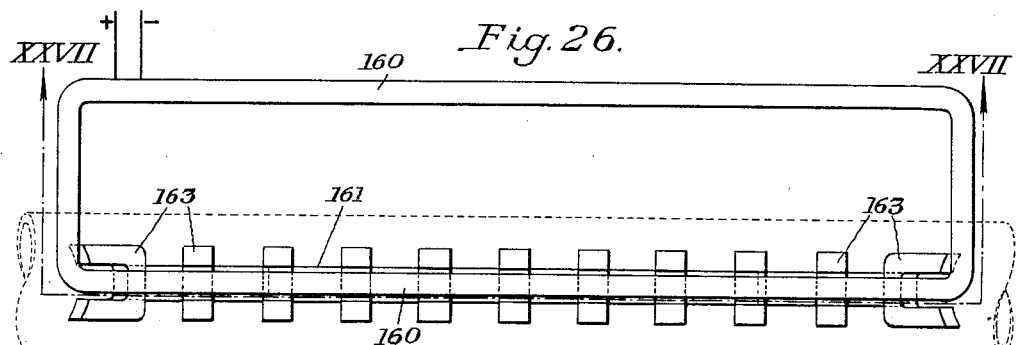
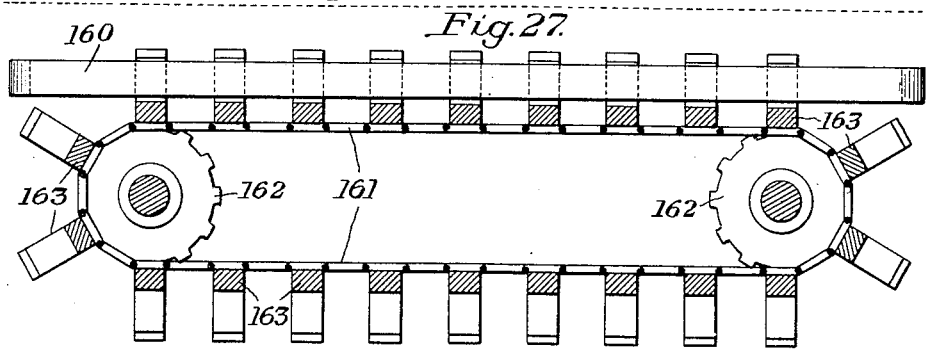
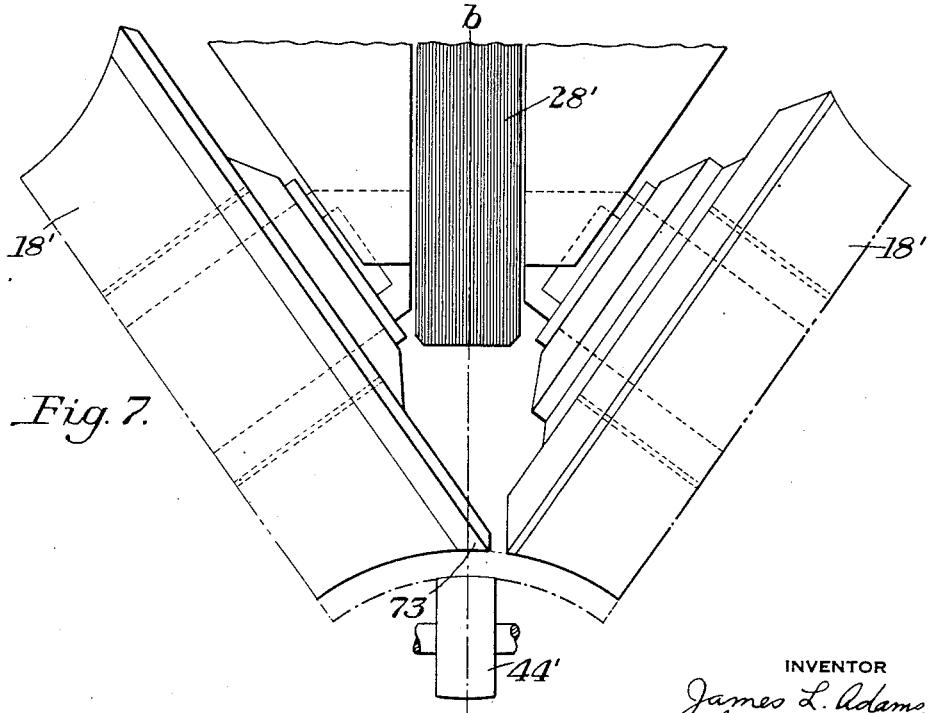

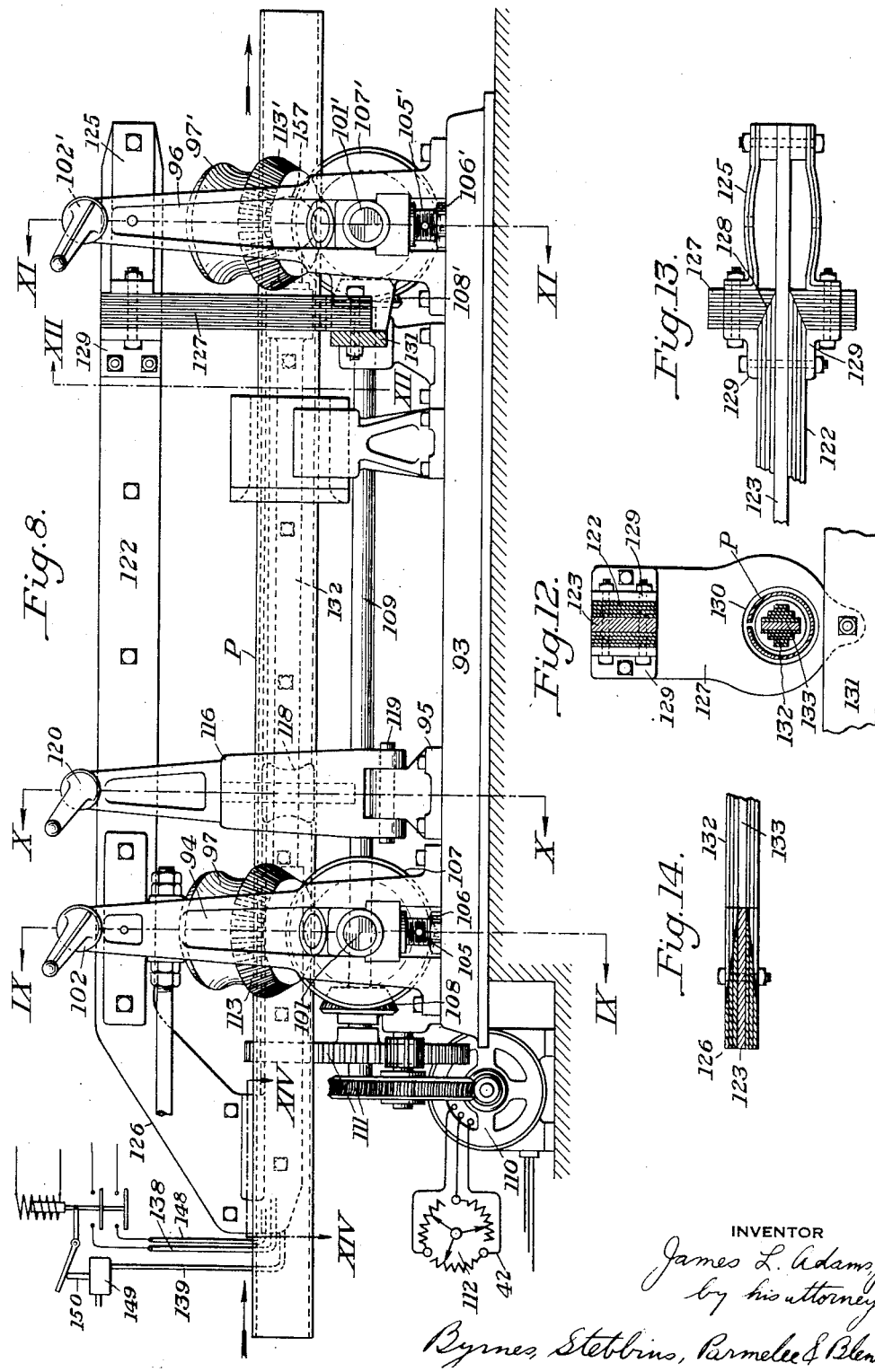

Dec. 7, 1943.  J. L. ADAMS, JR  2,335,894
WELDING APPARATUS AND METHOD OF WELDING
Filed May 20, 1930  13 Sheets-Sheet 7
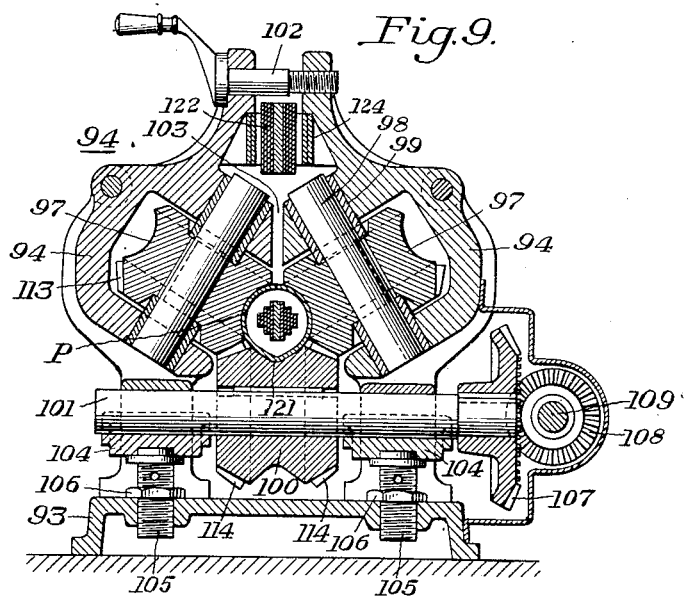
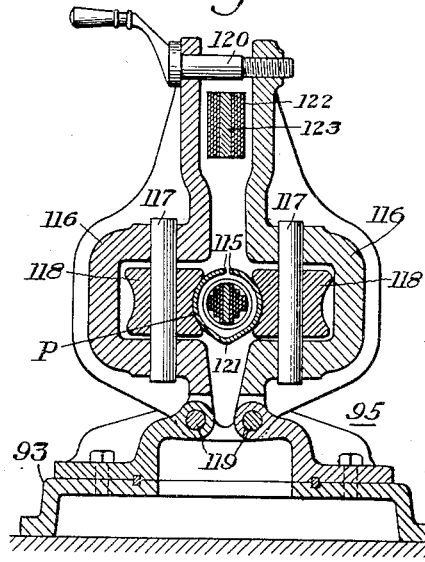
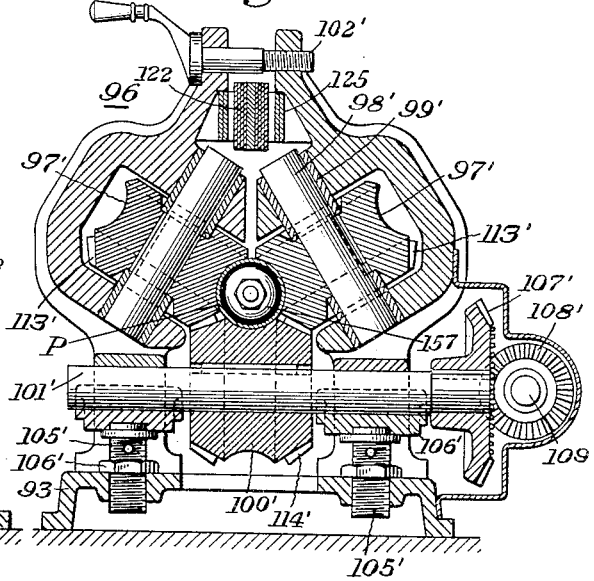
INVENTOR
James L. Adams, Jr.
by his attorneys
Byrnes, Stebbins, Parmelee & Blenko

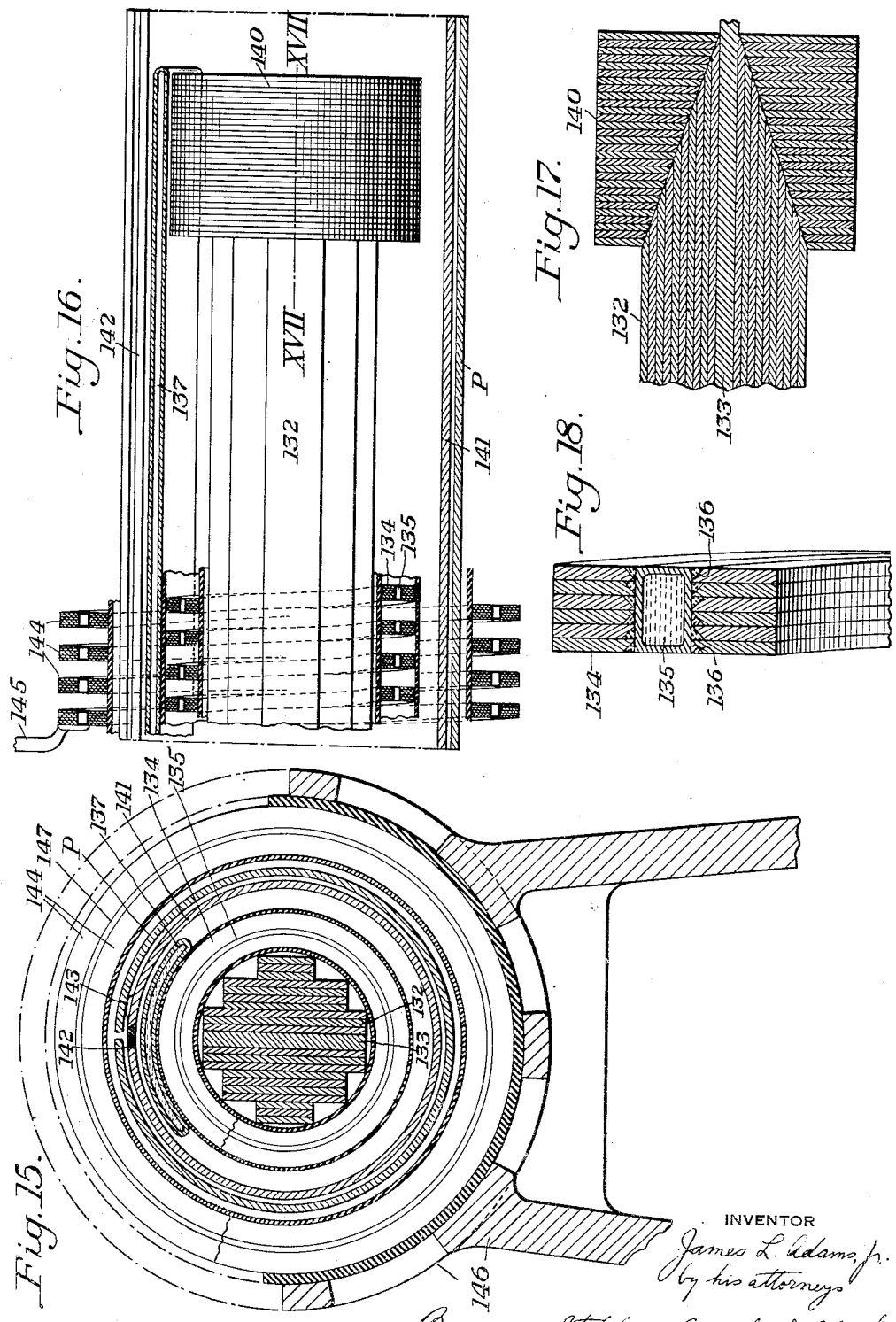

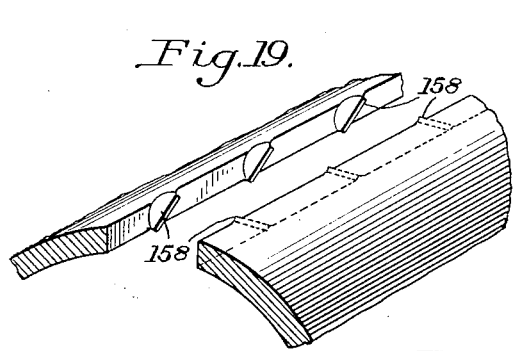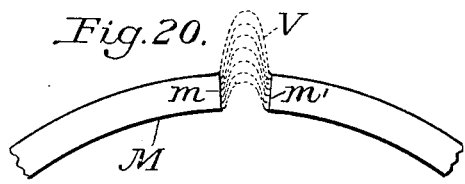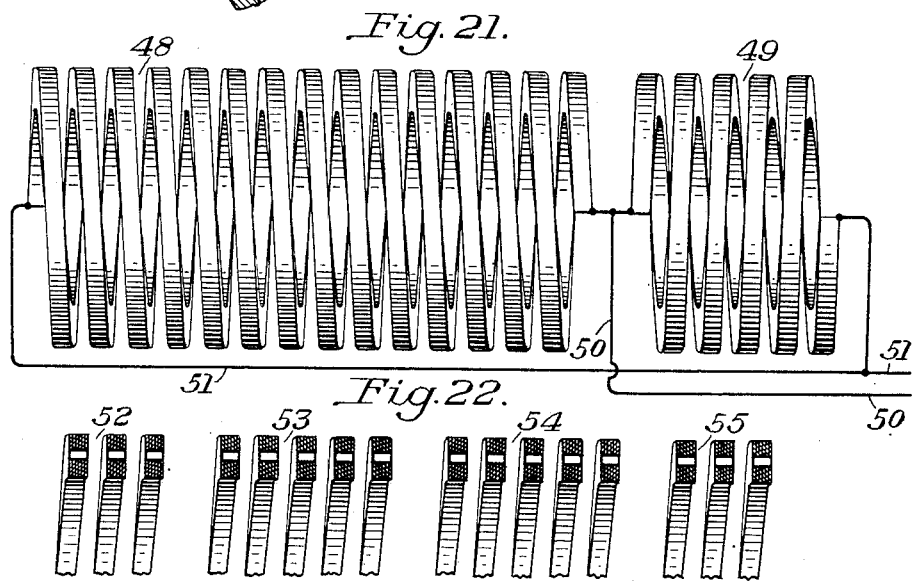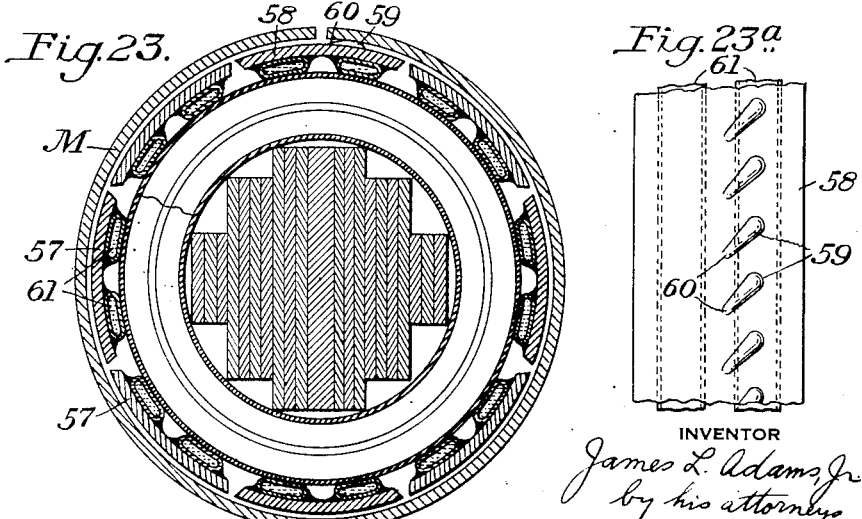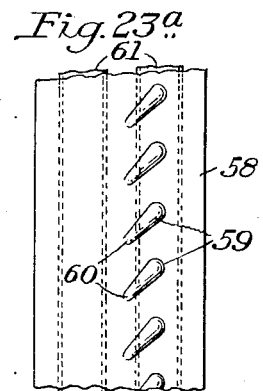

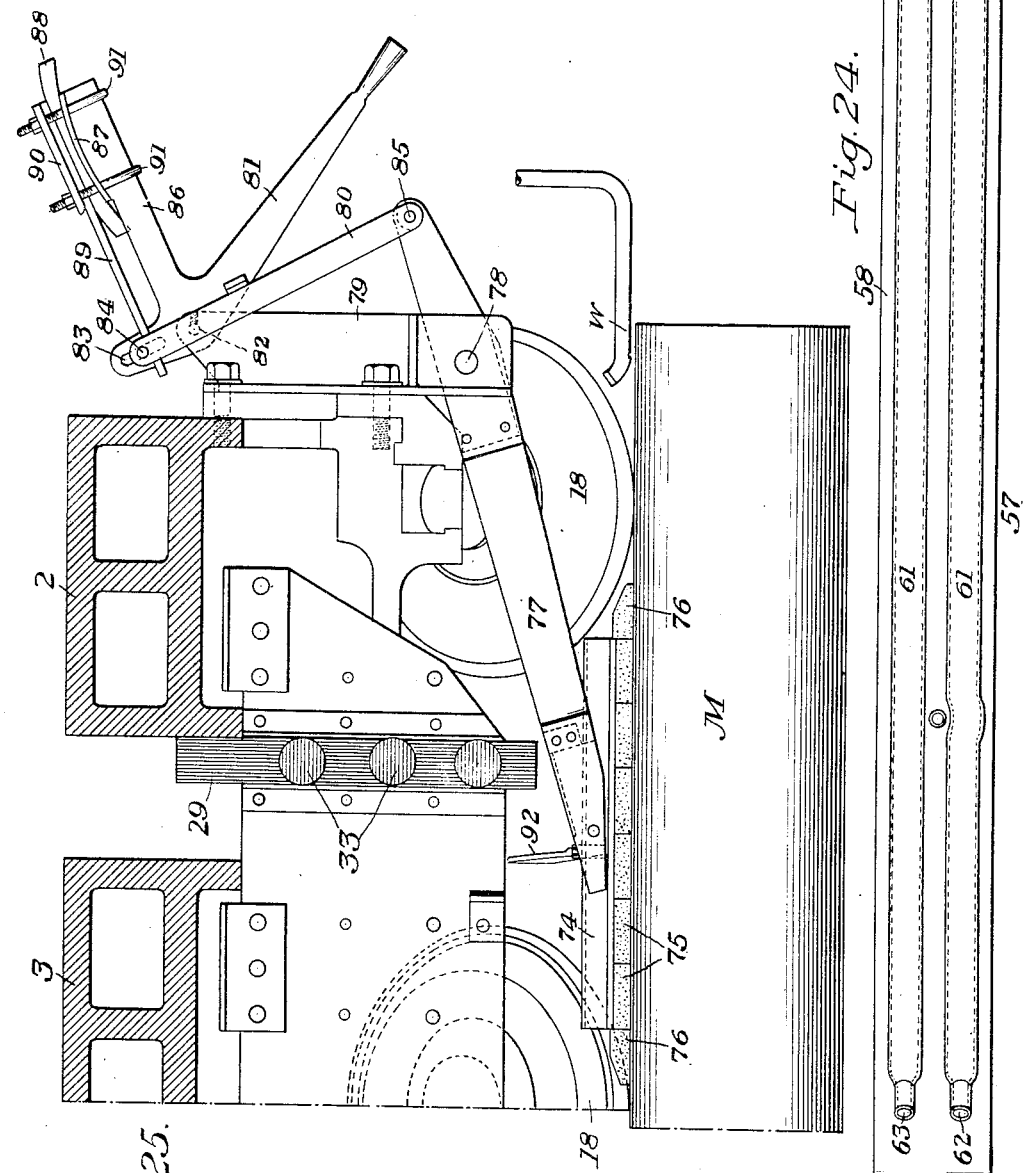

Dec. 7, 1943.                J. L. ADAMS, JR                 2,335,894
              WELDING APPARATUS AND METHOD OF WELDING
                Filed May 20, 1930        13 Sheets-Sheet 11
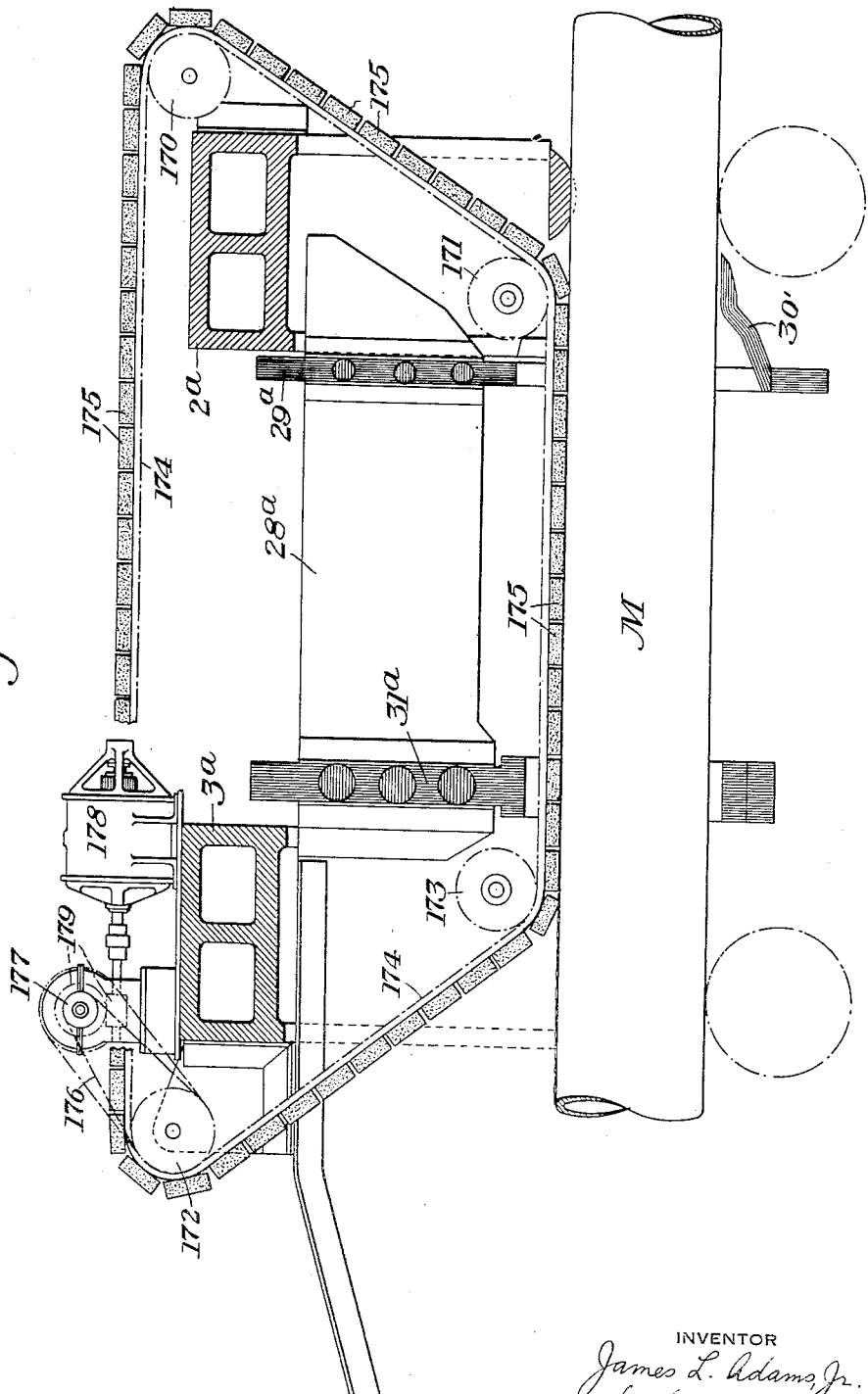
INVENTOR
James L. Adams, Jr.
by his attorneys
Byrnes, Stebbins, Parmelee & Brenko

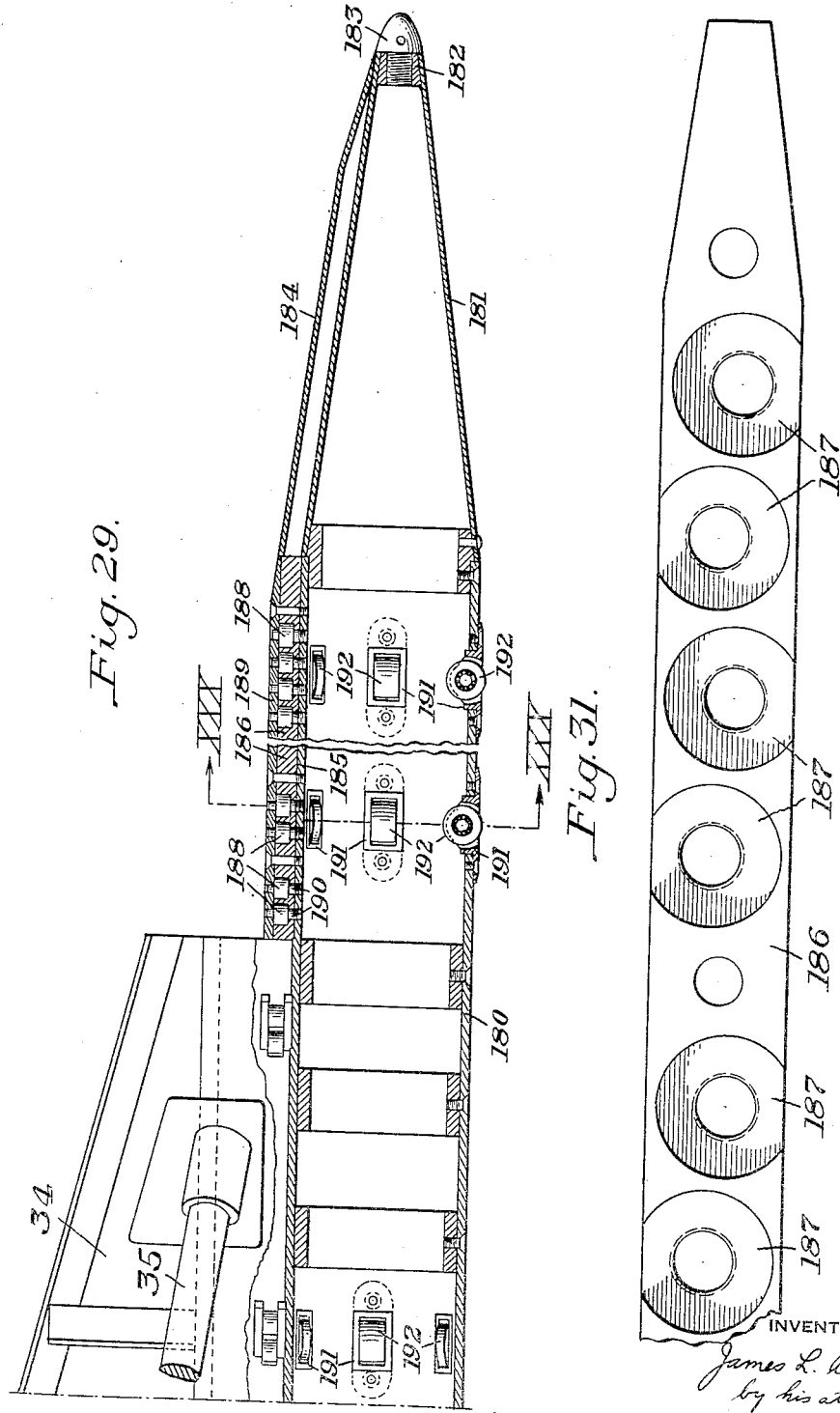

INVENTOR
James L. Adams, Jr.
by his attorneys
Byrnes, Stebbins, Parmelee & Blenko Patented Dec. 7, 1943

2,335,894

UNITED STATES PATENT OFFICE 2,335,894

WELDING APPARATUS AND METHOD OF WELDING

James L. Adams, Jr., Youngstown, Ohio, assignor to The Youngstown Sheet & Tube Company, Youngstown, Ohio, a corporation of Ohio Application May 20, 1930, Serial No. 453,838

24 Claims. (Cl. 219—6)

The present invention relates broadly to the art of electric welding, and more particularly to an improved method and apparatus for either the continuous or intermittent welding of metallic shapes and articles, and especially the welding of tubular shapes.

This is in part a continuation of my co-pending application, Serial No. 297,962, filed August 7, 1928, for Method and apparatus for welding (now Patent No. 2,181,445, dated November 28, 1939).

The art of electric welding has undergone a rapid development during the last few years. Up to the present time, however, while welding processes and machines have been produced and operated for the continuous or intermittent welding of materials, such as tubular shapes, they have been open to certain objections.

In the first place, most commercial installations have been designed to operate on the basis of supplying current by means of stationary or moving contacts in engagement with different portions of the pipe surfaces. In order to secure efficient operation of such types of apparatus, it has been necessary in most cases to subject the material to a preliminary cleaning, such as an acid dipping, or a mechanical surfacing operation either at the seam or adjacent the edges, or both, in order to insure not only a clean seam, but also the proper contact conditions for the input of the necessary welding current.

The present invention provides a method of welding which is not dependent upon any pre-cleaning or special treatment of the sheets or other materials which are to be welded. This constitutes a distinct advantage in the art in that it eliminates an expensive handling and pre-treatment operation. When it is considered that the mere mechanical handling of material of the character herein contemplated, not including any treatment, represents an expense in the neighborhood of 25 cents per ton, it will be appreciated that advantages result in direct proportion as the number of handling operations is reduced. Acid dipping, sand blasting, or mechanical surfacing near the edges, will add about 75¢ to $1.25 per ton more.

Commercial welding operations have further been characterized by distinctive types of welds, among which may be mentioned the stitch type and the surface type. While welds of these types are commercially successful for certain purposes, materials characterized by such welds cannot be used for all purposes in view either of the comparative mechanical weakness of the welds or the non-uniformity thereof. It is one of the purposes of the present invention to provide a welding method which shall be characterized by the the production of a continuous weld throughout the complete thickness of the material and of uniform characteristics throughout the length of the seam.

Difficulty has also been encountered in commercial installations in the handling of materials having a considerable thickness. While commercial methods are adaptable to the welding of materials up to a thickness of perhaps one-fourth of an inch, they have not been commercially suitable to materials having substantially greater thicknesses. It is a further purpose of the present invention to provide a welding method and apparatus which may be effectively utilized with materials of the maximum thickness ordinarily encountered in commercial articles such as it is desired to produce by a welding operation.

The present method and apparatus, for example, will effectively weld material having a thickness of one inch at a rate in the neighborhood of 30 to 50 feet per minute. This is given by way of example only and not by way of limitation inasmuch as the construction of the machine and the variable current input enable different welding speeds with different thicknesses of material to be satisfactorily obtained, within certain limits.

Heretofore in the art of welding there has been a further commercial difficulty having to do with the production of substantially straight tubular articles, i. e., articles free of camber. With known methods of welding, at least insofar as I am familiar with them, it has been impossible to produce an article sufficiently straight so as not to require a subsequent straightening operation to remove camber therefrom. This has, I believe, been due to two major factors. One of these has been the relatively great area of the complete article which has been subjected to an appreciable heating operation, and the other has been the relatively slow speed at which heating from end-to-end has been accomplished.

In accordance with the present invention I am able to effect a weld under such conditions that the heating is concentrated almost entirely at the seam, so that the major expansion tendency lies in too small a per cent of the total metal present to pull the latter out of its initial alinement very materially, and at such a speed that with a given piece of material the weld is effected with such rapidity that substantially uniform temperature conditions at the seam, insofar as their effect on the shape of the article is concerned, can be obtained.

From a commercial standpoint, therefore, the present method and apparatus may be briefly characterized by the following attributes:

1. The entire absence of pre-cleaning or pre-treatment of material.
2. Continuity or uniformity of weld throughout the thickness and length of the seam.
3. Effective welding of materials irrespective of the thickness thereof, within wide limits.
4. Maintaining the articles substantially free from camber or other deformation by reason of the welding temperatures.

Advantageous results of the character referred to are obtained by an inductive method of current input, as distinguished broadly from a contact method of current supply.

With the contact method of welding in which a mechanical or electrical contact is necessarily established between the material to be welded and a suitable conductor, there is a very appreciable as well as a variable loss in the current supply during the operation of continuous welding. This is true regardless of whether the contacts move with the material or not, inasmuch as different contacts are in engagement with surface portions of different conducting characteristics, and inasmuch as the individual contacts themselves, where movable with the material, are more or less spaced one with respect to the other.

These conditions therefore necessarily result in different temperature conditions at different times and points, with a resulting irregularity or non-uniformity in the character of the weld. In addition to objectionable results of the character referred to, any contact method of welding, regardless of the characteristics of the contacts, possesses the further disadvantage that due to the normally greater resistance in that path between the contacts, which includes the seam, as compared with the back path through the pipe, a very large portion of the energy supplied is wasted by heating the back portion of the pipe.

In actual practice this quantity varies in accordance with the inverse diameter of the pipe being welded, so that the total energy losses in the back path, and between the pipe and the contacts taken together, usually represents a very substantial, if not actually the greater portion, of the total energy input.

These disadvantages are in addition to the fact that with a commercial apparatus of the character which it has heretofore been possible to develop, and dependent upon the use of a current supply by means of a contact or contacts, it has not been possible to continuously weld pipes having a wall thickness much if any greater than $\tfrac{1}{8}$ to $\tfrac{1}{4}$ of an inch.

By supplying the heating current inductively, as before referred to, the objections and difficulties heretofore encountered with respect to contact types of welders either for resistance or flash welding, are obviated.

The present invention, although not limited to the so-called flash method of welding, is particularly adapted thereto, although it may be characterized by a combination of flash and resistance welding at different points progressively throughout the length of the material during the continuous movement thereof, as will be hereinafter more fully pointed out.

The flash method of welding, which is characterized by a relatively short flame condition spread substantially uniformly throughout a considerable portion of the length of an article, is the best possible method of quickly obtaining a uniform condition of the edges. An arc, as such, tends to concentrate itself at a relatively restricted point or points and produces an objectionable burning away at such point or points. A flash, on the contrary, will tend to remove any surface irregularities by a rapid planing off action and produce a substantially uniform edge condition.

This makes it possible to employ the flash method of welding without any accurate pretreatment or pre-cleaning of the edges of the material. On the other hand, if such material having uneven edges were subjected to a straight resistance welding, there would obviously be non-uniform resistance at different points throughout the length, thereby generally precluding the production of a uniform joint. A flash weld will take about one-half the k. w. input of the straight resistance type of weld, furthermore, or give double speed for the same input.

A flash method of welding is also characterized by the fact that it effects heating of high carbon spots. It therefore permits welding of non-uniform plate widths, as well as the welding of material having a non-uniform carbon content.

In the contact method of flash welding as heretofore carried out, it has been necessary for tremendous currents at low voltage to be fed into the work on one side of the seam and taken off on the opposite side through extremely heavy contact means applied under relatively great pressure to the metal surface.

It will further be apparent that any contact method of welding, regardless of the construction or arrangement of the contacts, and regardless of whether liquid or solid material is utilized, is necessarily characterized by a heavy current flow into the contact, and a second current flow out of the contact and into the material, as well as a tremendous abstraction of heat by its flow into these heavy water-cooled contacts from metal close to the seam. All of these difficulties have therefore necessarily limited the contact method to relatively low current values and consequently have limited the gauge of the material which could be successfully welded thereby.

With an induction welding apparatus, on the contrary, the only limit to the amount of current which can be supplied to the material for welding purposes is that determined by the capacity of the apparatus itself.

In the accompanying drawings I have shown for purposes of illustration only, certain preferred embodiments of the present invention.

Figure 30:
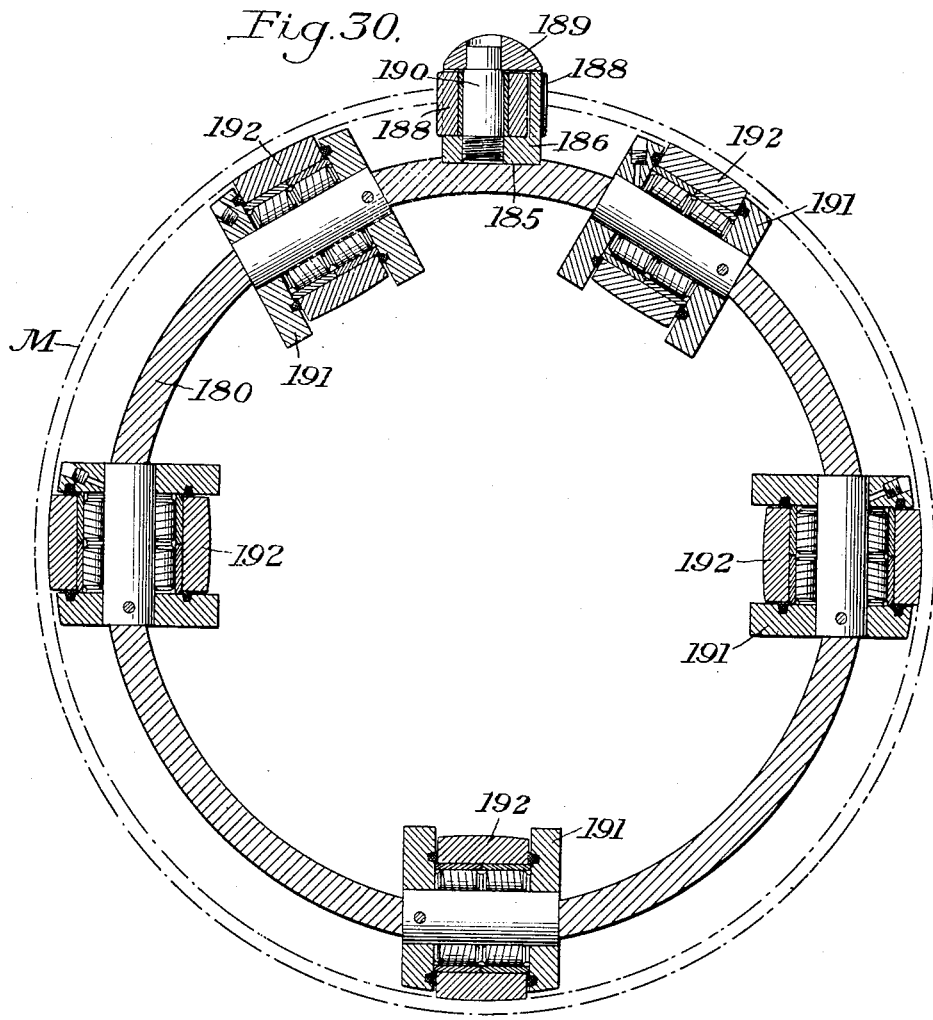
Figure 32:
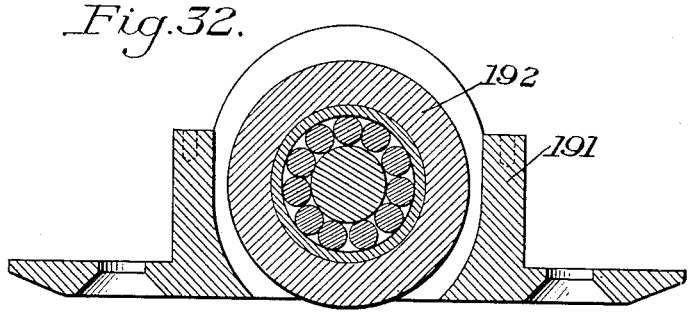

In the drawings,

Figure 1 is a view, partly in side elevation and partly in section, illustrating one form of apparatus constructed in accordance with the present invention, Figure 2 is a top plan view of the apparatus illustrated in Figure 1, Figure 3 is an end elevational view of the apparatus illustrated in Figures 1 and 2, certain of the parts being omitted for sake of clearness, Figure 4 is a transverse sectional view on the line IV—IV of Figure 1, certain of the parts being shown in elevation, Figure 5 is a detail sectional view illustrating a preferred form of construction of the working rolls utilized, Figure 5a is a view similar to Figure 5, illustrating the parts in locked position, Figure 6 is a side elevational view of the preferred form of carrier frame, Figure 7 is a detail view, on an enlarged scale, of a modified embodiment of my invention for obtaining confining of the almost molten material at the actual point of closing the seam, Figure 8 is a side elevational view of another form of apparatus constructed in accordance with the present invention, Figure 9 is a vertical transverse sectional view on the line IX—IX of Figure 8, looking in the direction of the arrows, Figure 10 is a transverse sectional view on the line X—X of Figure 8, looking in the direction of the arrows, Figure 11 is a transverse sectional view on the line XI—XI of Figure 8, looking in the direction of the arrows, Figure 12 is a detail sectional view, on the line XII—XII of Figure 8, looking in the direction of the arrows, Figure 13 is a top plan view of a portion of the apparatus illustrated in Figure 8, Figure 14 is a horizontal sectional view along the line XIV—XIV of Figure 8, looking in the direction of the arrows, Figure 15 is a vertical transverse sectional view, on an enlarged scale, along the line XV—XV of Figure 8, Figure 16 is a partial longitudinal sectional view, on an enlarged scale, through the pipe being welded, Figure 17 is a detail sectional view along the line XVII—XVII of Figure 16, Figure 18 is an enlarged sectional view of one of the coils, Figure 19 is a perspective view, partly broken away, and illustrating a slightly modified embodiment of the invention, Figure 20 is a diagrammatic view illustrating the repelling or repulsion effect produced by the utilization of an inner coil, Figure 21 is a detail view of a modified form of inner coil construction, Figure 22 illustrates a further modification of an inner coil in which the number of sections is increased, Figure 23 is a transverse sectional view, on an enlarged scale, through the inner core and coil assembly along the line XXIII—XXIII of Figure 1, Figure 23a is a top plan view of a portion of one of the protective sections for the inner core and coil assembly, Figure 24 is a plan view of the under side of one of the protective sections for the inner core and coil assembly, Figure 25 is a detail view of one form of mechanism for smoothing the joint, Figure 26 is a top plan view of one form of feeding mechanism, Figure 27 is a detail sectional view on the line XXVII—XXVII of Figure 26, Figure 28 is a view similar to Figure 25 illustrating still another embodiment of the invention, Figure 29 is a sectional elevational view of a slightly modified form of a rearward extension of the inner coil and core assembly, Figure 30 is a transverse sectional view on the line XXX—XXX of Figure 29, Figure 31 is a top plan view of a portion of the roller guide strip of Figures 29 and 30, and Figure 32 is a detail sectional view of one of the roll housings of Figure 29.

While inductive welding in accordance with the general principle of the present invention may be accomplished by the utilization of both inside and/or outside cores and/or coils, the characteristic results obtained by the different types of machine are fundamentally different. Under the temperature conditions to which the material must be subjected when it is being raised to a welding heat, there is of course a tendency for the molten and/or gaseous material to flow.

I have found that such flow may be very effectively controlled electrically in such manner as to produce at least a predominating flow of molten metal, vapors and impurities outwardly, so that the seam is effectively cleaned of any foreign matter, the impurities delivered to the outside of the article, and a clean joint insured. This can be obtained in accordance with the present invention by the utilization of an inside coil constituting a current carrying conductor, and by utilizing the material being welded as a moving secondary for such coil in such manner that when the seam metal is heated to molten condition and vaporized under the temperatures created, there will be a magnetic repulsion between the inner coil as one conductor and the seam metal vapor as the other conductor. From a commercial standpoint this constitutes a distinct advantage over welders as heretofore constructed and used.

These various features will now be taken up in detail so that a clearer and more complete understanding of the present invention may be had. For this purpose Figures 1 to 7, 21, 22, 23 and 24 of the drawings will first be considered.

In the preferred embodiment of my invention the welding is accomplished entirely within or between two roll passes. In order to provide these roll passes, I utilize two main frames 2 and 3, each of which will hereinafter be referred to as housings. The two housings are of generally similar construction, the details of one of the housings being illustrated in Figure 4. From this figure it will be apparent that the housing, which is preferably of steel and of special construction to withstand the tremendous strains to which it is subjected, is so shaped as to provide a series of roll-receiving openings 4, the openings facing the axis of the housing. Intermediate these openings are shaft bearings 5 of any preferred construction adapted to cooperate with the ends of the shafts 6 which are journaled therein.

Surrounding each of the shafts is an eccentric sleeve 7, all of which sleeves are of generally similar construction. All of these sleeves, with the exception of the two sleeves cooperating with the shafts 6 located in the upper portion of the housing on opposite sides of the center line thereof, are formed with bevelled gears 8 on one end preferably integral with the sleeve, and with bevelled gears 9 on the opposite end, preferably formed on removable collars screw-threaded into position on the sleeves and held against accidental removable by suitable keys 10. These gears, as will be apparent from Figure 4, are intermeshed with each other in such manner that rotation of one of the sleeves insures a corresponding rotation of all of the sleeves.

Such a rotation may be obtained by providing in each of the housings a shaft 11 carrying at its inner end a bevel pinion 12 meshing with one of the gears on one of the sleeves 7, and carrying at its outer end a worm wheel 13. Cooperating with this worm wheel is a worm 14 adapted to be rotated in any desired manner as, for example, by a hand wheel 15.

This hand wheel may be provided with teeth or ratchets 16 adapted to be engaged by a stationary pawl, rack or other holding means 17 whereby the parts may be held against accidental movement from any predetermined adjusted position. From the construction described, it will be apparent that rotation of the hand wheel 15 effects a corresponding simultaneous rotation of all of the sleeves 7 in one direction or the other.

Carried by each of these sleeves is a work roll 18, all of which are of generally similar construction, and all of which, with the exception of the two in the upper portion of each of the housings on opposite sides of the center line, are provided respectively with teeth 19 and 20, whereby all of the rolls may be directly intergeared in a manner similar to the intergearing between the respective sleeves.

Due to this construction, rotation of one of the working rolls effects corresponding and concomitant rotation of all of the rolls. This rotation may be accomplished by providing a drive shaft 21 in each of the housings, preferably opposite the adjusting shaft 11, and mounted in suitable bearings. Each drive shaft carries at its inner end a driving pinion 22 meshing with the teeth on one of the work rolls. At its outer end the drive shaft may be provided with a worm wheel 23 adapted to be driven by a driving worm 24 from any suitable source of power, such as an electric motor, not shown. It will be understood that the driving worms 24 for the separate housings may be driven either by a common shaft or by separate shafts as desired. In most cases, however, the working rolls will be driven at approximately equal speeds so that separate drives are not necessary.

The construction of the various gears 19, 20 and 22 is such as to provide for some relative radial movement therebetween, this relative movement being sufficient to enable all of the work rolls to be simultaneously adjusted toward or from the axis of the housing by means of the rotation of the eccentric sleeves 7 as before described. There is thus provided a mill including in each of its housings five working rolls adapted to be simultaneously rotated in the same direction, and capable of simultaneous adjustment toward or from the axis of the housing so as to accommodate them to articles of different diameters and to enable the degree of pressure applied to the material, as well as the final diameter of the article, to be varied at will.

The sleeves 7 and working rolls 18, lying in the upper portion of each of the housings and on opposite sides of the center line, differ in construction from the other corresponding parts only in that their adjacent ends are adapted to be spaced from each other, as clearly indicated in Figure 4, and not intergeared. This provides a space S, which in actual operation of the apparatus breaks the continuity of the metal conducting path which would be established if all of the sleeves and rolls were intergeared at this point. This break in the path is particularly important, as will be hereinafter more fully pointed out.

While I have described in detail only one of the housings, it will be apparent that the housings may be of generally similar construction and adapted for similar operation. The description of one will therefore suffice for both.

Intermediate the housings 2 and 3 is a roll carrying frame 25, shown in detail in Figure 6, for a plurality of combined pressure and holding rolls 26, any desired number of which may be provided. The carrier frame is of such construction that the pass provided by the rolls 26 may be enlarged or diminished by contracting or expanding the frame. This adjustment may be effected by utilizing a split or yieldable frame 25, as clearly shown in Figure 6, and providing a shaft 27 having oppositely threaded portions in engagement with the respective sections of the carrier. By reason of this construction, rotation of the shaft 27 in one direction will be effective for bringing the rolls 26 closer together, while rotation in the opposite direction will be effective for expanding the same.

While a split or yieldable frame of the character just referred to is effective for producing minor adjustments of the holding rolls 26, provision must be made for effecting major adjustments thereof in case of any substantial change in the diameter of the articles being welded. The construction illustrated in Figure 6 enables this to be accomplished by the bodily removal of the holding rolls 26 and the brackets 26' in which they are mounted, and the insertion of suitable shims or other spacing means intermediate the bases of the brackets and the pads 25' provided therefor on the carrier frame. By inserting shims or spacing means of uniform thickness behind each of the brackets, the desired relationship of all of the holding rolls can be maintained.

Positioned in the upper portion of the housings 2 and 3 and extending continuously therethrough in a plane intermediate the upper work rolls 18 of the respective housings, is a laminated yoke 28. Cooperating with this yoke is a pole piece 29, which is also preferably laminated, and which is provided with a central opening of somewhat greater diameter than the maximum diameter of the material to be welded in the apparatus. Cooperating with the central opening in the pole piece 29 are individual pole pieces 30, each projecting forwardly toward the actual center of the pass of the working rolls in the housing 2, as will be clearly apparent from Figure 1 of the drawings. I have found that very advantageous results are obtained by so constructing the individual pole pieces that they are effective for providing a magnetic flux path extending well within the zone defined by the outer peripheries of the working rolls 18 in the housing 2.

The desirability of such a construction and arrangement of the parts will be hereinafter pointed out. From Figure 3 of the drawings, however, it will be apparent that these individual pole pieces 30 constitute an approximately continuously extending magnetic path closely cooperating with the exterior of the material M illustrated as being operated upon by the apparatus.

Where it is desired to utilize the apparatus for relatively short lengths of material, I preferably provide a second pole piece 31, similar to the pole piece 29, but on the entering side of the housing 3. Experience has shown that improved results are obtained if the pole piece 31 is placed on the exit side of the housing 3, as shown in Figure 28, since it is then unnecessary to continuously initiate the flash by momentary contact at that point between progressing edges. This pole piece is similarly provided with a central opening of greater diameter than the maximum diameter of the material to be worked upon, and carries an inner laminated liner 32 adapted to directly receive the material M, but without contact therewith.

In view of the well known fact that magnetic flux in entering laminations through the broad side will produce an objectionable heating up of the same, I preferably provide in the yoke 28, and in line with each of the pole pieces 29 and 31 a series of plug inserts 33 characterized by laminations so disposed and arranged that magnetic flux may pass continuously through the magnetic circuit provided, while travelling at all times into and out of any given lamination in an edgewise direction.

Where the apparatus is designed for use with relatively long pieces of material or for continuous welding-up operations, the pole piece 31 and its cooperating parts may be dispensed with entirely. In such cases the magnetic yoke 28 may be continued rearwardly in the form of an overhung laminated beam 34 suitably supported by struts or stays 35 from the housing 34, the beam 34 being of suitable construction to provide the desired continuation of the flux path established by the yoke 28, such laminated continuation extending clear down to a central core 36 and being integrally associated therewith. In such case, however, it is better not to try to crush the tube, or even to contact its edges in this stand, since too great profusion of spittings is thrown off thus necessitating repeated cleaning of the rolls, without compensating advantages.

From the foregoing, it will be apparent that I have utilized the terms "continuous welding" and "intermittent welding" not as defining different characteristic operations, but as defining operations with respect to the material worked upon. The term "intermittent" as utilized herein has reference to individual lengths of material, while the term "continuous" has reference to operations characterized by the welding-up of lengths of material greater than those which have ordinarily been considered as representing commercial pipe lengths.

Where, however, the pole piece 31 is to be utilized, the beam 34 will be constructed entirely from the standpoint of the mechanical load which it is designed to carry and not from the standpoint of providing a flux path. In such case, the splice plates 37 may be of non-magnetic material, so that a closed magnetic path is not provided between the beam and the inner assembly 36, shown in detail in Figure 23. In such case, furthermore, the inner assembly will include an inner pole piece 39 approximately in the plane of the ends of the individual pole pieces 30. With such a construction, the magnetic path will be provided, for example, from the pole piece 39, to the individual pole pieces 30, to the pole piece 29, thence to the yoke 28, and by way of pole pieces 31 and liners 32 into the inner pole piece 38 and thence on through the core of the coil. This path, as will be apparent particularly from Figure 1 of the drawings, will include two air gaps each of sufficient dimensions to receive the material being welded.

Where, however, a continuous welding operation is practiced which is not dependent upon the employment of the pole pieces 31, 32 and 38, they may if desired be completely eliminated and a magnetic path directly established at the entering end of the apparatus between the beam 34 and the inner assembly by a construction of the character hereinbefore referred to. This improves the working conditions inasmuch as it provides a magnetic flux path having only a single air gap represented by that necessarily provided between the outer individual pole pieces 30 and the inner pole piece 39.

Cooperating with and carried by the inner assembly is a coil 40 having leads 41 and 42 extending rearwardly through the assembly and connected to a suitable source of electric current not shown. This current, will, however, preferably, be derived from a moderate voltage source of sufficient power capacity for an inductive welding operation of the character herein contemplated.

With the construction thus described, a piece of material M bent to substantially tubular form may be fed into the apparatus over the inner assembly, and beneath the beam 34, and into the path of the working rolls in the housing 3. These working rolls will be effective in some cases for crushing the tube to uniform size, or again for bringing the opposed edges of the material into the desired adjacent or abutting relationship, while preferably retaining the same out of contact one with the other. Thereafter the material will travel into the pass provided by the adjusting rollers 26, which may be so adjusted as to maintain proper spacing between said edges. During this time the material will have traveled over a portion of the coil 40.

Continued travel of the material will cause it to pass over the remainder of the coil 40 and also over the inner pole piece 39 and into the plane of the axes of the working rolls in the housing 2. These rolls will be effective for further deforming the material and for bringing the edges into actual contact under such pressure conditions that the desired weld may be effected.

In actual practice the relationship of the parts may be such, for example, that the edges will come into contact at some point intermediate the rolls 26 and the plane of the axes of the working rolls in the housing 2. As the edges are first brought together, it being assumed that the coil 40 is energized, a short circuit condition results in the material M, which material constitutes a moving secondary. This results in the production of a very short arc or flash, which tends to travel or spread backwardly a very appreciable distance along the seam. This flash condition having been initially created, is thereafter substantially uniformly maintained in space irrespective of, and during, the travel of the material forwardly through the apparatus.

From the actual point of contact rearwardly to the point at which the flash does not occur, there is provided a zone which may be designated as the flash zone, while from the point of first contact to the plane including the axes of working rolls in the housing 2, there exists what may be designated the resistance heating zone, in which the edges, heated to a welding temperature, are in intimate contact. By properly adjusting the rolls 26, the extent of the flashing zone may be varied as well as the actual division between the flashing and resistance zones. The separation between the edges in the flash zone leads to a greater voltage across the seam, and consequently a much greater percentage of energy input to the seam itself than is the case for plain resistance welding.

The greater the extent of the gap, so long as the arc is not extinguished, the greater the voltage across the gap and the greater is the fraction which it represents to the total generated in the single turn of the movable secondary. This being true, the gap takes a correspondingly greater fraction of the total energy put into the single turn of the secondary, and the $I^2R$ losses through the back path provided by the metal represent a correspondingly minor fraction of the total energy input so long as the pipe diameter involved is not over two or three feet.

This being true, it will be apparent to those skilled in the art that substantially all of the current going through the pipe represents actual welding current, the potential drop across the gap acting as a controlling factor for the total current flow. This is distinctly different from the old so-called contact type of resistance welding in which the current flow through the back path is not directly limited by the voltage across the seam, and in which the current in the back path may rise to tremendous values, all of which values represent total losses.

It will be apparent that if the working rolls were continuously in contact with each other all around the pipe, they would also constitute a portion of the secondary and would therefore be subject to objectionable heating up. Such heating would not only be objectionable from the standpoint of the installation itself, but also from the standpoint of the tremendous losses which such heating would represent.

The provision of the coil on the inside of the material being welded is not only extremely desirable from the standpoint of the welding characteristics of the apparatus, but also from the standpoint of constructional characteristics. These welding characteristics will first be referred to, reference for this purpose being had to Figure 20 of the drawings. In this figure the material M is shown as having its adjacent edges $m$ and $m'$ in slightly spaced relationship, this figure representing a condition such as exists in the flash zone before referred to. In this zone the heating will be such as to bring the temperature of the material to a point at which a portion thereof will be vaporized. This vaporized metal will act as a secondary conductor spaced from the coil 40 which constitutes a primary conductor, and in which the current flows in the opposite direction from that induced in the vapor.

This being true, there is a magnetic repulsion between the two conductors. Since the conductor provided by the coil is not free to move, the vapor V will be forced outwardly in the manner indicated in Figure 20 to an extent determined by the repulsion, this in actual practice having been found to be great enough to effectively clear the heated joint of any foreign material, so that when the edges are subsequently brought into contact there is nothing to prevent the formation of a substantially perfect weld.

This outward repulsion of the vapor possesses the decided advantage of completely freeing the edges which are to be brought together to form the seam, of any impurities, whereby when the edges are finally brought into engagement with each other for closing the seam, only pure metal is included in the seam itself. This obviously aids very materially in the production of a weld which is not only more nearly perfect, but which is more nearly uniform from one end to the other.

This represents a further advantage of providing a flash zone preliminarily to the final closing up of the seam, inasmuch as an operation characterized by a continuous maintaining of the edges in abutting relationship would necessarily be such as to prevent the obtaining of any outward repulsion effective for producing a scavenging or cleaning action. So far as I am aware, it has heretofore never been proposed to provide a coil inside of a pipe and utilize the characteristic action thereof for cleaning the joint and freeing it of impurities. It will be apparent that such a condition could not be obtained in an apparatus utilizing only an inner core, since a core constitutes merely a flux carrier, while a coil constitutes a dynamic factor or actual flux producing means.

The amount of the repulsion increases with extreme rapidity as the two conductors are brought toward each other and decreases as the conductors are moved apart. With any very appreciable distance intervening between the two conductors, there is provided an air and metal space of such dimensions as to accommodate a substantial fraction of the magnetic flux of the primary and/or secondary conductors, so that the energy transfer, as well as the repulsion effect is very considerably reduced. From this it will be apparent that close association of primary and secondary is essential for high energy delivery, and that two conditions are desirable in order to obtain effective cleaning of the joint. One of these is the formation and maintenance of an appreciable zone in which the edges of the material are sufficiently separated to permit the generation and repulsion of vapors, and the other, the maintenance of a sufficiently close relationship between the two conductors such that no very large area air path for the magnetic leakage flux exists.

A further distinct advantage is inherent in the maintenance of this flash zone and its vaporizing of a portion of the metal of adjacent edges of the material. It will be understood by those skilled in the art that the volume of gases generated when the metal is vaporized will be in the neighborhood of 1000 times as great as the original volume of the metal so vaporized. This volume of gases continuously repelled in the manner referred to and even overflowing to some extent out of the other side of the seam, will result in maintaining a non-oxidizing atmosphere such that the formation of oxides and their subsequent inclusion in the joint is prevented.

Furthermore, if the vapors travelling at high velocity were permitted to travel inwardly, they would, upon striking the inner coil and core assembly, be condensed and solidified thereon, thereby resulting in an objectionable building up on the assembly. By means of the present invention this action is almost entirely obviated, so that cleaning of the inner assembly is not often required.

From a constructional standpoint, it will be apparent that the inner coil utilizes a space which is serviceable for no other purpose. If the coil were placed exteriorly to the pipe, it would necessarily result in much greater separation of the roll housings and a corresponding increase in the size of the apparatus with its consequent operating and functional disadvantages and difficulties. Certain of these objections would result directly from the increase in the difficulties of maintaining the edges in the desired relationship for accurately controlling the flash zones and resistance zones. The major portion of the magnetic leakage flux between the primary and secondary traverses the air or other intervening material and extends longitudinally of the coil axis. When an inside coil is used, therefore, there is practically no leakage of flux in the exterior rolls and the outside guide parts external to the secondary constituted by the tube blank. The losses and heating resulting from any currents in such exterior elements are thus reduced to a minimum by my construction.

I may, if desired, provide the inner assembly with inner rolls 44 and 45 mounted with their axes 46 and 47 slightly offset, as clearly shown in Figure 1, or provide other equivalent means, so that they may be adjusted for increasing or decreasing their over-all dimension. These rolls are preferably effective approximately in the plane of the axes of the working rolls 18 and are so disposed that the roll 44 directly underlies the seam and tends to produce a smooth inner wall on the material. In actual practice, I prefer to construct these rolls of non-magnetic material, such as non-magnetic steel, although commercially satisfactory results are obtainable with ordinary gray cast iron rolls.

While there is not an abrupt cessation of heating when material with a heated seam has passed out of the plane of the pole pieces 30 and 39, there is a decided falling off in this plane in the amount of heat generated in the pipe. Heat losses by conduction as well as by radiation being continuous, it is apparent that if the distance between the point of maximum metal temperature and the point of completion of the welding is too great, the temperature may fall to such a point that a successful weld cannot be produced. By extending the individual pole pieces 30 in the general manner indicated in the drawings, and more particularly in Figure 1, it is possible to get these two points so closely adjacent that the desired temperature conditions may be maintained during the actual final closing of the seam. This disposition of the parts, permitted by the use of an inside coil, therefore constitutes an important operating advantage of the present invention, although it represents a construction which is not imperative for welding purposes.

From a practical standpoint I have found that this disposition of the parts in a welding operation such as that hereinbefore described permits the production of a joint having very desirable characteristics. By properly correlating the time of pressure application and the amount of pressure application to the time of heating, where the heating has been substantially entirely confined to the edge portions of the material, it is possible to produce a seam characterized by highly desirable grain structure. The ordinary welding operation, due to the manner of heating the seam material, permits a considerable heat transfer by means of conduction throughout a substantial portion of the tube area. It is of course well known that heat produces grain growth. This being true, any portion of the material which is heated beyond the thermo-critical temperature has a larger grain size than that portion which is heated only to approximately such temperature. The portion heated to approximately the critical temperature only has a refined grain structure which is more desirable than the structure of the parent body of the material.

Due to the extreme rapidity by which heating is accomplished in accordance with the present method, and the fact that the flash limits the heat to the extreme edges immediately prior to the actual pressure application, the pressure can be great enough to extrude substantially all of that portion of the metal which has been heated beyond a thermo-critical temperature, thereby bringing the transition zones of material, characterized by refined grain structure produced by heating to the thermo-critical temperature, together at the seam. A seam produced in accordance with the present invention, therefore, in which the seam is freed of impurities and in which the transition zones are brought together at the seam, possesses a grain structure superior even to the grain structure of the parent body, and therefore has a greater strength.

In addition to this correlation of time of pressure application and amount of pressure application to the time and manner of heating, I may subject the seam at the time it leaves the working rolls 3 to the action of a cooling medium. This may be accomplished by providing a water jet $w$ preferably in the form of an arcuate shoe overlying the seam and provided with any desirable number of outlets. The quantity of water will be so regulated as to not cool the material at the seam to a temperature much if any below the thermo-critical temperature, whereby any grain growth will be immediately checked and an actual refining will take place.

It will be understood that by suitable analysis of the seams, it can be easily determined whether the amount of cooling medium should be increased or decreased.

The separation of the heating zone into a flash zone and a resistance zone is highly desirable not only for the reasons pointed out, and including the fact that the gap determines the percentage of energy input to the seam, but for the further reason that a materially greater and more concentrated heating effect is obtainable by the flash method for a given amount of energy input than is possible by the resistance method. For this reason the working rolls in the housing 3 are not usually so set as to bring the edges of the material into contact during passage of the same therethrough. If the edges are contacted or crushed by these rolls, they are allowed to separate very slightly for a considerable distance thereafter. If the edges remained in continuous contact from one roll pass to the other, the energy input would be nearly tripled, and yet the weld which would be produced would not usually be as satisfactory. In fact, no purely progressive resistance induction welding has ever been carried out, to applicant's knowledge, and many attempts in this direction have resulted in failures in spite of the much improved apparatus available in making such attempts as compared with prior art structures.

Having regard for the different conditions encountered in the different zones, I have found that extremely desirable results may be obtained by constructing the inner coil in the manner ilulstrated more particularly in Figure 21, in which the coil is shown as comprising two sections 48 and 49, the section 48 being of a length generally comparable to the length of the flash zone, and the section 49 being of a length generally comparable to the length of the resistance zone. While, by reason of the low voltages utilized, it is not difficult to effect the desired insulation between the different coil sections, I preferably wind the coil sections in such way that the adjacent ends of the sections 48 and 49 have the same potential, thereby enabling them to be connected to a common lead 50, while the remote ends of these coils may or may not likewise be connected to a second common lead 51.

One of the advantages, however, of the sectional coil construction is that it permits a variable energy input into the different sections, which input bears some ratio to the difference in requirements between a flash welding operation and a resistance welding operation. In other words, with the sectional construction it is possible to impress a slightly different voltage on the flash coil 48 than on the resistance coil 49. While this is not necessary to the functioning of the apparatus, it gives a type of control of heating conditions which is not otherwise obtainable.

In Figure 22 there is illustrated still another embodiment of the coil in which it is divided into a materially greater number of sections 52, 53, 54 and 55. While I have illustrated only four sections in this figure, it will be apparent that the number of sections may be increased at will so as to have each section effective over a correspondingly smaller area of the material being welded. By this division of the coil into sections, with each section exerting its full heating influence on a given unit of length of material, it is possible to heat the end portions of the material to substantially as high a temperature as the intermediate portions. To this end it may, in some cases, be desirable to make the end sections 52 and 55 smaller than the intermediate sections 53 and 54 so that the extreme ends of the material can be maintained at the proper temperatures.

For further reducing the pipe-end scrap losses, I may, if desired, actually weld the material before it is subjected to the usual pre-weld flat end trimming operation. It is well understood by those skilled in the art that flat just rolled material of the character ordinarily utilized for the formation of tubes usually has a so-called fish-tail formation near the two longitudinal edges at its opposite ends. By welding up the material before trimming, the weld may be carried more nearly to the extreme ends of the material, and by thereafter trimming the same, the scrap losses are reduced to a minimum. It will be understood that this feature of welding to the extreme end is of great importance commercially in that if scrap losses run to any appreciable percentage, the advantages of welding electrically may be almost completely offset by such losses.

Referring particularly to Figure 23, it will be seen that the inner coil and core assembly is of special construction with respect to the enclosing and shielding means for the operative parts thereof. Due to the intense heat developed at the joint, it is essential that means be provided for protecting the coil or coil sections from this heat. This may be accomplished by providing an enclosing casing in the form of a series of sections 57 extending partly or completely around the assembly and spaced one from the other a sufficient distance so that a closed conducting path is not provided. One of these sections 58 may be positioned directly under the line of weld and is provided at spaced points along its length with spots or projections 59 adapted to engage the under side of the material adjacent one edge thereof and hold the same out of other contact with the casing sections.

These supports or projections will preferably be inclined in one direction or the other so as not to provide collecting shoulders for foreign material, and will preferably have tapered ends 60 so disposed as to provide gradually sloping portions over which the material may travel during the welding operation. It will be apparent that similar supports cannot be provided for the opposite edge of the material inasmuch as the provision of such supports would cause a short circuiting directly across the seam. The inherent rigidity of the material, however, is such that by maintaining one edge in spaced relation to one of the sections, the desired results can be obtained.

In Figure 24 one of the sections 57, which herein comprises that section which immediately underlies the seam, is illustrated in detail, the section being shown inverted in this figure and partly broken away so that the construction can be more easily understood. Secured to the under side of the section is a pair of water cooling conduits 61, welded or otherwise secured in position in such manner as to provide an efficient heat interchange between the same and the section. Each of these water cooling conduits is shown as being of generally hairpin shape so that the cooling water may be passed from one end of the section to the other. This operation is permitted by providing a suitable inlet 62 and outlet 63 to which a source of cooling water may be connected. A much improved coil protection is afforded by the use of a flat sided coil, with the flat located adjacent the seam. This later development is disclosed and claimed in my co-pending application, Serial No. 461,979, filed June 18, 1930, and will therefore not be referred to in greater detail herein.

The construction of each of the working rolls is preferably such that the tire or working portions 64 thereof may be readily removed without dismantling the machines. This may be accomplished by constructing the tires in sections each of substantially semi-circular shape. Each tire half may be secured in position by a combined tightening and locking screw 65 having a portion 66 threaded in one direction for engaging the tire section, and a portion 67 threaded in the opposite direction for engaging the main body of the roll. The intermediate portion 68 is enlarged and provided with teeth 69 on its periphery adapted to be engaged by a special tool 70 insertible through an opening 71 in the tire periphery. This opening may normally be closed during the welding operation by a closure plug 72, a locking pin 70' being inserted in place of the tool 70 to prevent loosening of the parts. By reason of this construction, any tire section may be removed at will and a new tire section substituted. This makes it possible to not only quickly replace tire sections as they become worn, but to substitute other tires having different outside diameters.

In Figure 7 there is illustrated a slightly modified embodiment of the invention in which parts corresponding to the parts already described are designated by the same reference characters having a prime affixed thereto. In this figure there is shown in end elevation the yoke 28' with a working roll 18' on each side thereof. The line ab represents an axial line passing through the center of the roll pass and the center of the yoke 28'. It will be noted that the working roll 18' shown on the right in this figure is so shaped that it terminates a substantial distance at one side of this center line, while the roll 18' on the opposite side is shown as provided with an extension 73 projecting across the center line and therefore across the line of the seam. This construction, together with the inside roll 44', forms a closed pass at the point of application of welding pressure, whereby the amount of plastic material which it is possible to extrude is definitely controlled.

This closed pass makes it possible to apply materially greater pressure and thereby, under all conditions, to effect a seam of improved quality. The increased pressure tends to work the hot metal somewhat and give the resulting seam a refined grain structure. It will be understood that this modified roll construction is only used in the housing 2' at the exit end of the apparatus.

In Figure 25 there is illustrated one form of a scraping mechanism which may be employed if it is desired to completely remove any surplus molten metal thrown out along, but still adhering to the edges adjacent to the seam. This scraping mechanism is herein illustrated as comprising a holder 74 within which is mounted a series of scraping and cleaning blocks 75 preferably of carborundum or other high heat resisting abrasive material. The length of the holder may be varied at will and the end blocks 76, where the holder is of such length as to extend from the working roll 18 in the housing 3 to the working roll 18 in the housing 2, may be shaped to lie closely adjacent the roll peripheries. During the travel of the material under the shoes, they will be effective for removing any side accumulations of molten blown-out metal as rapidly as it is forced out under the magnetic repulsion referred to.

The holder may be carried by an arm 77 having a pivotal mounting 78 on a suitable bracket 79 on the front of the housing 2. The opposite end of this arm is connected by a link 80 to a bell crank lever 81 having a pivotal mounting 82. This bell crank lever has a slot 83 engaging a pin 84 on the link 80, whereby upon a swinging movement of the bell crank lever 81 in a counter-clockwise direction the link 80 may be drawn across a center line passing through the pin 84, the pivot 82 and the pivotal connection 85 between the link 80 and the lever 77. In this position the parts are locked against accidental movement.

Inasmuch as it is preferable to so mount the scraper that it will exert a yielding pressure, the bell crank lever 81 has an extension 86 provided with a curved seat 87 carrying a spring pad 88. Cooperating with the spring pad is a leaf spring 89 adapted to be clamped in position by a follower 90 which is engaged by suitable screw threaded yokes 91. By loosening the nuts on these yokes, the spring pad 88 may be moved in one direction or the other to correspondingly effect the adjustment of the leaf spring 89 and thereby its effectiveness on the scraper mechanism.

In view of the extremely high temperatures which are produced, the scraper blocks would be rapidly eroded or worn away if the same portions thereof were permitted at all times to remain in engagement with the hot metal. To overcome this, I may provide a bracket 92 to which a suitable mechanism, not shown, may be connected for oscillating the scraper in a direction transverse to the plane of the seam for thereby constantly bringing new portions of the scraper blocks into action.

The preferred embodiment of the invention illustrated, and the form which is now about to be described, illustrate an inner assembly comprising both a coil and core. This is preferred in most cases in view of the better magnetic flux path provided by the inner core. With fairly large size pipes, however, as, for example, say 24 inches O. D., or over, it is conceivable that the inner core might possibly be omitted if desired, inasmuch as the air space provided in such relatively large diameter pipes can be made to provide a sufficient flux path for the magnetic flux.

The foregoing description has also been predicated on the use of an alternating current. It will be understood, however, by those skilled in the art, that any periodically varying current such as either an alternating current or a pulsating direct current may be utilized if desired. In all cases, however, where a pulsating current is employed, the size of the core and yoke provided will of necessity be of greater cross sectional area than for an alternating current of the same frequency.

Reference will now be had to Figures 8 to 18 of the drawings for the purpose of describing another embodiment of the present invention, such as has, in general, been shown in my co-pending application, Serial No. 297,962, filed August 7, 1928. In this embodiment the welding apparatus comprises a base 93, of any desired construction, having supported thereon roll stands 94, 95 and 96. These stands are hereinafter designated as "first closing roll stand," "flash regulating roll stand," and "final closing or welding roll stand," respectively, although such "first closing roll stand," so called, may not, and usually will not, be called upon to actually bring the two edges into contact.

Carried by the first closing roll stand 94 is a series of rolls 97 mounted on angularly extending shafts 98 supported in suitable bearings 99 in the roll housing. These rolls cooperate with a bottom roll 100 suitably secured to a shaft 101 extending transversely of the housing. The opposite sides of the housings are so constructed as to provide spaced relationship at the upper ends, as clearly shown in Figure 9, and are adapted to be adjusted toward or away from each other by means of an adjusting screw 102, effective for slightly changing the diameter of the roll pass formed by the rolls.

The rolls and the housing, as well as the bearings for the rolls, are of such construction as to provide a continuously open space 103 from the center of the roll pass through the upper end of the housing to the plane of the adjusting means 102 for the purpose hereinafter more fully pointed out.

The shaft 101 may be mounted in vertically adjustable bearings 104, carried by adjusting screws 105, by means of which the bearings can be raised or lowered as may be desired in order to provide a roll pass of exactly the dimensions required. The adjusting screws may be locked in position by means of nuts 106. For driving the shaft 101 it may be provided on one end with a bevel gear 107 meshing with a more or less similar pinion 108 on a shaft 109. This shaft preferably extends lengthwise of the apparatus, and may be driven by a motor 110 through a suitable system of reduction gearing 111. The motor may be of any desired type or construction, but is preferably of the variable speed type adapted to have its speed controlled by a suitable regulating means 112. For driving the rolls 97, they may be formed with integral gear teeth 113 adapted to mesh with integral gear teeth 114 on the bottom roll 100, as clearly apparent from Figure 9 of the drawings.

The rolls 97 and 100 may initially be so set with respect to the diameter of the pipe P being welded as to bring the spaced edges 115 thereof into contact, or into close proximity, as desired, as the pipe passes between the rolls.

The roll stand 95 is provided with a pair of similar housings 116, each of which carries a substantially vertically extending pin 117, on which pins are journaled rolls 118 to act on substantially diametrically opposite sides of the pipe. The housings are indicated as being carried on suitable pivotal mountings 119, at their lower ends, and as cooperating at their upper ends with an adjusting means 120, similar to the adjusting means 102 before described.

It will be apparent to those skilled in the art that instead of pivotally mounting the housing sections 116, they may be constructed similarly to the first closing roll stand for adjustment by springing thereof to the extent required to properly adjust the rolls 118. These rolls will normally be so set with respect to the diameter of the pipe being welded as to permit the edges 115, if closed during passage through the roll pass of the first closing roll stand, to slightly open, as indicated in Figure 10, for the purpose hereinafter more fully pointed out.

The final closing or welding roll stand 96 is conveniently of a construction generally similar to that of the first closing roll stand, and parts corresponding to those already described in connection therewith are designated by the same characters having a prime affixed thereto.

It will be apparent from the description thus far given of this modified form of my invention that the first closing roll stand corresponds generally to the housing 3 and its associated parts; that the final closing or welding roll stand 96 corresponds to the housing 2 and its associated parts, and that the intermediate or flash regulating stand corresponds in general construction and function to the carrier frame 25 and its associated parts.

From the operation described, however, it will be understood that in the contemplated operation of this embodiment of the invention the material is usually actually compressed to a sufficient extent in the first closing roll pass so that the edges are brought into actual contact, while in the operation of the embodiment illustrated more particularly in Figure 1 of the drawings, it is contemplated that usually the edges will be maintained out of actual contacting relationship, although these conditions may be reversed, if so desired, with either construction.

In an alternative embodiment, actually tried out, and shown diagrammatically in Figure 28, the roll housing 3 of Figure 1 was placed outside of or ahead of the laminated pole piece 31, so that the first closing or "crushing" operation on the pipe could be carried out extraneous to the entire magnetic circuit, and thus as a simple mechanical process, and incidentally giving a powerful feed to the pipe. This disposition of the coil and pole pieces is much preferable to that shown either in Figure 1 or Figure 8, as has been determined by actual usage, since the latter give too much electrical activity in the seam at the first stand, during the desired purely crushing operation, if such is called for. This results in considerable burning off of the edges, with no resultant gain.

The pipe sections as prepared for delivery to the welding apparatus of Figures 8 to 18, are preferably of a cross sectional shape generally similar to that illustrated in Figure 9 of the drawings, providing a hump 121 substantially diametrically opposite the plane of the meeting edges 115. The pipe, if closed during its passage between the rolls of the first closing roll stand, will tend to spring open as the pressure of these rolls is released, the extent of opening being controlled by the rolls 118 of the flash regulating roll stand. Thus, during passage through the first closing roll stand, the edges will usually be brought into contact, which contact will subsequently be broken to the extent permitted by the initial setting of the flash regulating rolls.

As before described, the percentage of energy input to the seam being welded will be determined by the amount of space between the edges 115, as determined by the flash regulating rolls, and while it is desirable to increase this energy percentage as much as possible within the capacity of the apparatus, this space must not be made too great for two reasons. In the first place, if the space is made sufficiently great, the characteristic flash will be lost and, if the voltage induced be high enough, an arc will result which is objectionable due to its localized action. On the other hand, too great a space immediately results in breaking of the flash completely, and losing the weld. If desired, in place of the hand regulated means 120 herein illustrated, I may provide automatically adjusting means responsive to the energy input in such manner that the flash regulating rolls will be automatically adjusted to maintain this input within predetermined limits. Such modification, however, represents a development of the present invention and not one of its essential elements. It is therefore not shown in the drawings or introduced into the claims.

It will also be apparent that while I have, for simplicity, herein illustrated but a single stand of rolls for regulating such flash, the number of stands may be increased at will and the individual stands spaced at desired points throughout the length of the apparatus.

Extending between the two adjacent edges of the roll stands 94 and 96, and insulated therefrom in any desired manner, is a laminated magnetic yoke 122. If desired, this yoke may be stiffened by a central solid bar 123, although such a construction is not essential. The yoke 122 may be secured to the first closing roll stand by means of spring plates 124 or other equivalent means permitting the roll stands to be adjusted slightly in the manner described without disturbing the supporting relationship with respect to the yoke. Similar means 125 may be utilized for supporting the yoke adjacent the final closing or welding roll stand 96. The construction must, however, be such as to maintain the yoke in predetermined relationship to the roll stands, and particularly in predetermined relationship to the axis of the pipe being welded.

Adjacent the entering end of the apparatus, the yoke 122 is formed with a downwardly projecting portion 126, which on the line XIV—XIV only, is preferably of generally narrow wedge shaped cross sectional area as indicated in Figure 14 of the drawings, the taper of the sides being such as to permit the edges 115 of the pipe in passing close thereto to gradually move into adjacent relationship under the influence of the first closing roll stand 94.

Adjacent its opposite end, the yoke 122 carries a downwardly projecting laminated pole piece 127 of the construction illustrated more particularly in Figure 12 of the drawings, and preferably joined to the yoke along angularly extending lines 128, as indicated in detail in Figure 13, although other types of joints may be utilized. The yoke and pole piece may conveniently be held in cooperative relationship by means of angle brackets 129 on opposite sides of the yoke.

At its lower end, the pole piece 128 is formed with an opening 130, somewhat chamfered off on its entering side, and of slightly greater diameter than the exterior diameter of the pipe being welded, to permit the same to pass freely therethrough. At its extreme lower end the pole piece 128 may be secured to the roll stand 96 by any suitable non-magnetic cross bar or other means 131. All pole pieces should of course be split, as is well understood in the art, so as not to present a closed path around the circular surface.

Extending continuously between the downwardly projecting portion 126 and the pole piece 128 is a central magnetic core 132, of such dimensions as to permit the free passage thereover of the pipe being welded. This core is preferably of laminated silicon steel construction with a solid bar center 133, three-eighths of an inch or so in thickness, as illustrated in detail in Figures 15, 16, 17 and 22. Around a portion of the length of the core 126 there is a coil 134, shown as extending well back toward the entering roll stand 94, although experience indicates that a considerably shorter coil, kept well up toward the welding roll at the right, is preferable, for reasons pointed out. This coil may have incorporated therein cooling means 135, either centrally, or preferably along its inner edge only, and of any desired construction. In Figure 18 I have illustrated the first mentioned embodiment. It will also be noted from Figure 18 of the drawings that each turn of the coil 134 is characterized in general by a plurality of edgewise conductors carried by a single cooling means.

All of these windings will preferably be connected in parallel in order to give the necessary cross sectional area for the conductor and to provide an efficient heat interchange between the same and the cooling means. This joint for the purpose of transmitting heat may be obtained by cutting off the inner edges 136 at an angle and welding the same to the cooling means.

There may or may not also be provided intermediate the coil 134 and the pipe P, a non-magnetic cooling jacket 137. Cooling fluid may be supplied to the cooling means 135 and the jacket 137 through suitably insulated inlet connection 139, and outlet connections associated with the electric conductors 138 and 148 extending outwardly from the interior of the pipe through the space between the edges 115 and at the left hand end of the downwardly projecting portion 126. Current to the coil 134 may be supplied thereto through suitable means 138 and 148. Proper coil insulation is of course provided as required.

Adjacent the final closing or welding roll stand 96 the core 132 is provided with a split circular pole piece 140, the magnetic joint between which and its core is preferably made of generally V shape, as indicated in Figure 17, so as to permit the desired change in the direction of flux, as understood in the art, and as hereinbefore described in referring to the desirability of having flux enter and leave the laminations through an edge thereof rather than through the broad side.

Surrounding the cooling jacket 137, the coil 134, the pole piece 140, and the core 132, may be a guide 141 conveniently in the form of a length of high-resistance non-magnetic metal pipe of C-shaped cross section, having the opening 142 between its edges preferably in alinement with the space between the edges 115 of the pipe being welded. This space, in actual practice, may or may not be filled with suitable heat resisting insulating material such as mica, adapted to be replaced at will, or even by an insulated water-duct, not shown, but serving to protect the inner assembly from any particles of the heated metal which may be thrown off from the pipe during the heating operation. This pipe C will preferably be subdivided into slats, which may be water-cooled, as shown in Figures 23 and 24, if desired, over the coil areas.

It will be understood that the guide 141, together with the cooling jacket 137, serve the general purpose of the structure described in Figures 23 and 24. For the same purpose there may be provided along one edge of the guide 141, spots or projections 143 similar in purpose and construction to the spots or projections 59 hereinbefore described.

It will be further understood that the inner coil 134 may be constructed in sections for the purpose hereinbefore set forth. In Figures 8 and 16 I have shown, in addition to the inner coil 134, an exterior regulating coil 144, fed in turn through suitable heavy leads 145. This coil likewise may be constructed in either one or more sections. Where such exterior regulating coils are provided, they are conveniently supported on suitable brackets 146, it being apparent that they are insulated therefrom in any desired manner.

These coils as illustrated more particularly in Figures 8 and 16, whether comprising a single section or a plurality of sections, will also be preferably of such nature as to be adjustable axially of the pipe being welded, whereby the heating up voltages or the energy inputs along different portions of the seam may be accurately controlled, it being remembered that under the coil conditions existing, the working voltage and energy input along the seam at any point can be lowered by shifting the primary coil or coils away from that particular location, and vice versa, the major energy transfer occurring in those portions of the moving secondary which are closest to the primary current flow areas. The primary current will crowd over radially in each turn toward that edge which is closest to the secondary current flow, and the latter will try to do likewise with respect to the primary current, thus increasing the mutual inductance of the system, and the input into the tube, as far as the constructional limits will permit.

In the flash welding process, the voltage across the seam should usually be somewhat higher and the energy input lower during the flash period than during the first initial contact interval, if any, as established by the first closing roll stand, or the later contact by the welding roll stand, according to the welding process under consideration, and the coil disposition indicated gives a convenient means for governing this factor. In this connection, it is to be noted that while electric and magnetic conditions encountered, as well as the characteristics of the joint to be produced, indicate that the internal unitary or subdivided primary coil is the best, it is perfectly possible to provide a welding apparatus in which the entire winding has a position exterior to the pipe being welded.

It is to be understood, however, that in such cases the magnetic repulsion is inward in the flash or vapor zone and special precautions must be taken with respect to the construction of the inner assembly. Where the pipe being welded, however, is of such small diameter as not to provide sufficient space for an internal coil, together with its core, the external coil may of necessity be resorted to. I have also found that while with larger pipe diameters, the requisite heating energy can easily be supplied at 60 cycles, smaller and smaller tubes require higher and higher frequencies, experience indicating that frequencies up to from 240 to 550 cycles per second give desirable results. This is because the smaller pipe diameters do not provide sufficient inside room for the required lower frequency core cross sections necessary when heavy stock is to be handled at speeds of the character hereinbefore referred to.

I have also found that in many cases the combination of an external and internal primary winding each having approximately the same number of turns is desirable, inasmuch as the magnetic repulsion effect of one on the pipe seam is more or less cancelled by the other. In such cases, however, while the total amount of hot ejection material is very greatly reduced, such as is left appears about equally on the inside and outside of the pipe, and greater effort is required to finally clean off the inside of the seam, where it is hard to get at, after the welding.

The pipe, after having passed the inner pole piece 140, is at a temperature such that it may be effectively welded, and at this temperature enters the roll pass of the final closing or welding roll stand 96, wherein it is acted upon by the rolls 97' and 100', the dimensions of the pass being such that the heated edges 115 are brought into welding engagement and pressed together to some considerable extent. In fact, the initial contact occurs well before this stand is reached, the pressure between edges rising gradually thereafter, up to the weld roll position. The contour of the bottom roll 100' is preferably such as to remove the hump 121 and develop a true circular outline in the pipe. It will be apparent to those skilled in the art that the metal constituting the hump, when moved to its new position under the influence of the bottom roll 100' tends, upon leaving the roll pass, to resume its original shape. This has the effect of holding the newly welded edges in tighter engagement, thereby obviating possibility of tearing such edges apart.

Instead of utilizing a contour of the character referred to including the hump 121, I may adapt my apparatus to the handling of truly circular shapes by providing a series of holding rolls adapted to cooperate with the welded pipe and prevent separation of the edges during the cooling thereof. In fact I have found that usually no such holding rolls are required for pipe of one-half inch wall thickness or less, as the hot weld is amply strong to prevent opening up of the seam, after the work which has been done upon said weld by the final closing rolls.

In the operation set forth with respect to this embodiment of my invention, it will be understood that short circuiting may be made to take place in the first closing roll stand, followed by the creation of a flash when the edges separate, as distinguished from the operation heretofore described in which the initial contact preferably does not occur until after the material has passed through the work rolls of the housing 3. After the initial creation of the desired flash zone, however, it is maintained in space in one embodiment just as in the other.

Inasmuch as the pipe constitutes a movable secondary, the importance of constructing the roll stands in such manner as to provide a continuously open space between the opposite sides thereof from the surface of the pipe being welded to a point at least above the plane of the return yoke 122 will be apparent. The water jacket 137 does not constitute a continuously closed conducting path, and the guide 141 is provided with a space between its adjacent edges, thereby insuring a condition in which there are no great current losses through any paths other than the path formed by the pipe secondary itself. To this same end the supporting means 131 for the pole piece 127 and the bracket or brackets 146 for the outer coils or coils 144, will be of non-magnetic and preferably sub-divided material, and all of the parts will preferably be suitably insulated one from the other to prevent extraneous losses in the apparatus.

All of the primary coils are herein illustrated as being edgewise strap wound. While such a construction is desirable, it is not imperative that this system of winding be followed. Each of the coils is, however, preferably provided with cooling means, the inner coil being shown as including an integral cooling pipe 135, while the outer coil includes a similar cooling pipe 147, through which former duct 135 cooling water or oil may be passed in any desired manner from insulated terminal ducts 138, 139 and 148. Similar ducts, not shown, would be used with pipe 147.

In Figure 8 of the drawings there is illustrated more or less diagrammatically a form of intercontrol between the current supply to the coil or coils and the cooling water supply to the cooling means therefor. In this figure water pipes associated with terminal connections 138 and the terminal connections 148 constitute the twin return paths of the water flow system, whose single inlet pipe 139 is shown as connected to a supply valve 149. This supply valve has an operating stem 150 projecting therefrom. Cooperating with the line wires L and L', by means of which current is supplied to the coil or coils, is a circuit interrupter 151, having an operating connection 152 with the stem of the valve. For operating the circuit interrupter, there is shown a solenoid 153 within which operates a core 154 connected to the circuit interrupter. The core is normally urged downwardly in such manner as to open the circuit interrupter, by a spring 155. When, however, the solenoid is energized, the circuit interrupter 151 will be moved to closed position for supplying current to the primary coil or coils and the valve 149 will be opened for supplying cooling water to such coils.

Water connections to 149, and from the ducts associated with conductors 138 and 148 are of course taken off through insulating hose, except that sometimes 139 may be direct through metal if the inlet is made at the electrical neutral point of the coil, where the flow may then split and return via two paths, as indicated above.

By reason of this construction it is impossible to deliver current to the coils until a supply of cooling fluid is also delivered. It will be understood that the valve casing which delivers cooling water to the coils may be the same as that which delivers cooling water to the cooling jacket or other cooling means provided, and furthermore, that this type of inter-control for current and cooling medium is applicable to any type of apparatus built in accordance with the present invention. If desired, the water may simply be left running all the time the machine is in service whether current is on or not, thus eliminating the necessity of such means.

While the apparatus illustrated in Figures 8 to 18 has been described as a complete unit, the construction is such that it is adapted to be utilized in series with a forming machine by means of which sheet or plate material is bent to the desired form for delivery to the welding apparatus. The roll stand construction herein disclosed may provide convenient means, for example, for the attachment of braces or tie rods 156 adapted to lead to such a forming machine, one of which is disclosed in my co-pending application, Serial No. 297,963. The type of forming machine, however, is not material to the present invention, it being apparent that any suitable forming apparatus may be utilized.

For cooperation with the final closing or welding roll stand, a suitable inside mandrel comprising rolls similar to those heretofore described, under items 44 and 45, or a plug 157 may be utilized. Where a plug is employed, it will preferably be of high speed, hardened steel or other special construction, having an outside diameter such as to form the desired inside diameter in the pipe as it passes through the welding pass. It may be carried in any desired manner, as by a suitable extension on the end of the inner assembly.

In Figure 19 of the drawings there is illustrated a slightly modified construction with respect to the original characteristics of the sheet or strip used to form the article being welded. As pointed out, the flash process may be initiated by simply bringing edge portions of the material into abutting relationship. If desired, however, the edges may be formed with angularly intersecting thin ridge 158. If these respective ridges lie at about equal but opposing angles to the wide faces of the plate when the latter lies flat, they will intersect and give a small area contact when the plate is folded to tubular shape. A small area of initial metal contact quickly initiates a flash. This, therefore, is particularly desirable with exteremely high speed welding. The thin ridges are easily crushed back to give certainty to the successive equally spaced contacts, the contacts rapidly becoming burned away by the flash which is formed, as before pointed out.

Actual tests, however, indicate that no special treatment of the edges is essential, and that a flash once initiated anywhere along the edges, will quickly spread as far as the gap spacing and the coil location will permit, provided the energy input into the flash zone be high enough, and that such flash will back up along the seam as the pipe moves forward, so as to maintain the same approximate flash position in space.

In Figures 26 and 27 there is illustrated a form of feeding means which is particularly useful with welding apparatus in which it is not desired to bring the seam edges together, or to subject the material to too great a crushing effect during the feeding operation. This feeding means is illustrated as of the magnetic type including a heavy stationary coil 160, to which current may be supplied from any desired but preferably direct current source. Cooperating with this stationary coil is an endless chain belt 161 carried by sprockets 162, one or both of which may be driven in any desired manner as, for example, direct from a welder shaft. Carried by the belt is a series of blocks or cores 163 of magnetic material and preferably of substantially U shape to straddle a portion of the coil during the operation of the belt.

The cross sectional area of the coil will be so chosen with respect to the opening in the traveling core pieces as to lie below the outer surface thereof. This outer surface is preferably given a curvature generally corresponding to that of the material which it is desired to move. Since the coil is stationary and wound of heavy copper, with no moving contacts or brushes, there is no difficulty in the supplying of the requisite energy, and no frail moving wires or parts to give trouble, thereby making it possible to provide extremely effective and rugged magnetic feeding means which progressively come into contact with the material and move outwardly away from the same after their feeding movement has been completed.

In Figure 28 of the drawings there is illustrated a form of joint cleaning mechanism which, more particularly for larger pipe sections and when welding at high speeds, I have found to be advantageous over that illustrated in Figure 25. In accordance with this embodiment of the invention, the housings 2a and 3a may be spaced a distance corresponding to the housing sections 2 and 3, or they may be separated a slightly greater amount. The yoke 28a carries a pole piece 29a and a second pole piece 31a, these pole pieces being of the general construction heretofore described and illustrated, for example, in Figure 1 of the drawings.

Carried by the housing 2a is an upper guide roll 170, while within the housing and adjacent the path of travel of the material being welded is a second guide roll 171. Similarly, the housing 3a carries an upper guide roll 172 and a lower guide roll 173. Cooperating with these guide rolls, as illustrated more or less diagrammatically in Figure 28, is an endless conveyor 174 on which are mounted a series of blocks 175 which may be generally of the construction and characteristics of the blocks 75 shown in Figure 25.

The guide roller 172 is herein illustrated as being driven at a relatively low speed through a sprocket chain 176 from a sprocket wheel 177 which is in turn driven by a motor 178 through a suitable reduction gearing 179. This motor is conveniently carried directly by the housing 3a and may be operated either to move the blocks 175 in the direction of movement of the material M or in a direction opposite thereto as desired. In either case, the rate of travel will be such that the blocks will be maintained at a temperature low enough to prevent their burning out, the length of the travel while out of contact with the material preferably being very materially greater than their length of travel in contact with the material, whereby an opportunity for effective air cooling is provided. This type of construction is preferable in some respects to that illustrated in Figure 25, in that a better opportunity is afforded for cooling of the blocks, whereby their length of life is materially increased.

It will be understood that the necessary changes may be made in the construction of the housings to permit the passage of the endless conveyor with its abrading blocks. It will further be apparent that cleaning devices of the character illustrated in Figures 25 and 28 are not limited in their utility to any particular forms of welding apparatus, but are adapted to use with any form of welder in which continuous welding is effected.

In many cases I have found that it is desirable to so construct the inner coil and core assembly as to facilitate the guiding of the material onto the same, and the proper holding of the material thereon. It will be understood by those skilled in the art that the material may be formed up in any one of a number of different ways, some of which obviously will produce a more accurate blank than others. In all cases, however, it is desirable that the blank or material be fed through the apparatus with the seam in a definite position. To insure the accomplishment of this result, I may utilize a construction as illustrated more particularly in Figures 29 to 32, in which figures the inner coil and core assembly is shown as having a tubular extention 180 projecting therefrom on th entering side of the machine. This tubular extension terminates in a generally conical head 181 which is conveniently rolled to proper form from a suitably shaped plate. At its extreme end, the conical portion 181 may have welded thereto a filler 182 internally threaded to receive a nose-piece 183 over which the material first passes in entering the apparatus.

With the embodiment of the invention illustrated in the drawings, in which the seam of the material is on the upper side as fed into the apparatus, the conical portion 181 may be provided with a fin 184, conveniently welded thereto and projecting upwardly therefrom in such position as to extend between the adjacent edges of the material.

The main tubular body 180, which is of a diameter such as to effectively cooperate with the larger end of the conical extension 181, and constituting a continuation thereof, is conveniently provided with a groove 185 within which is inserted a roller guide strip 186. This roller guide strip is of the construction illustrated in Figure 31, having opposed openings 187 adapted to receive guide rollers 188. These rollers, as will be clearly apparent from Figure 30 of the drawings, are of such dimensions as to project slightly beyond the edges of the strip 186 in such manner as to form a rolling contact for the edges of the material in engagement therewith. By properly choosing the width of the strip 186, and the diameter and location of the rollers 188, the desired space between the adjacent edges of the material may be maintained while it is passing over the guiding extensions. Cooperating with the strip 186 is a cover strip 189, which strip is of such construction as to provide bearings for the upper ends of roller shafts 190, the lower ends of such shafts being threaded into the strip 186. By this construction, a smooth upper surface is provided.

In addition to the rollers 188, the extension 180 is also preferably formed with a series of openings at predetermined points throughout its length, with each of which openings cooperates a housing 191 as illustrated in detail in Figure 32. Journaled in each of these housings is a roller 192, the periphery of which projects slightly beyond the outside of the extension as will be apparent from Figure 30. Any desired number of such guiding rollers 192 may be provided so that the desired cooperation with the inner surface of the tubular material is provided.

It will be apparent to those skilled in the art that an extension of this character provides means for properly centering the material during its passage into the welding apparatus, and also for maintaining the edges thereof in the desired spaced relationship and in the desired position for the performance thereon of an effective welding operation.

While I have herein illustrated and described the invention as adapted to the forming up of pipes from a single width of material, it will be apparent to those skilled in the art that in utilizing the invention for the formation of tubes of relatively large diameters, a plurality of parallel sheets or strips may be utilized, each occupying its own fraction of the total pipe perimeter. It is not uncommon practice at the present time to construct large pipes of two or more individual strips or sheets, and with evident, but not essential modifications, my invention can be adapted readily to the simultaneous or successive welding of a plurality of seams.

Insofar as I am aware, the present invention provides the first apparatus effective for continuous flash welding by maintaining in space a predetermined flash zone. Such a zone, as pointed out, gives rapid heating to a limited portion of the seam metal and enables vapor repulsion so that a clean seam of uniform characteristics can be obtained. It also enables such rapid heating as to provide a finished article free or substantially free from any camber.

Other advantages of the invention arise from the provision of an induction type of welder, as distinguished from a contact type, as well as from many of the individual features of the construction disclosed and described, by means of which either the necessary mechanical or electrical operations are effectively obtained.

While I have referred throughout the present description to heating by means of induced current, it will be apparent to those skilled in the art that there will also be some heating by reason of the eddy currents generated, and also partly by hysteresis, it being understood that the heating due to hysteresis ceases after the decalescent point at which the metal becomes non-magnetic is reached. It will further be understood that the amount of heat due to hysteresis is governed by the frequencies employed, and the higher the frequencies the greater the amount of heating due to hysteresis. As lower frequencies are used, a much larger proportion of the heat is generated by induced current.

It will also be apparent to those skilled in the art that while the material has been shown as being fed to the welding apparatus with the seam on the upper side thereof, it may be fed to such apparatus with the seam in any other desired position upon making the necessary changes to this end. In some cases, for example, I have found it desirable to effect the weld with the seam at the bottom of the material inasmuch as the repulsion effect of the inside coil as herein described is, in such a position of the parts, augmented by the action of gravity. The downward opening also permits any foreign material such as scale and the like which may have been loosened during the forming up operation to freely drop between the edges prior to the completion of the weld.

In still other cases, I have found that certain desirable results are obtainable with the seam located in a substantially horizontal plane inasmuch as any extruded matter is free to drop away from the material from the outside thereof and not to collect adjacent the seam on the inside, and therefore in the track of the inside rolls.

Reference has herein been made to the tendency of an arc to travel erratically from point to point after it has been initiated, and to the advantages of a flash as distinguished from such an operation. I have further found that the desirable results obtainable from the use of a flash zone are in many cases improved or increased if the material is maintained in a narrow width flash zone of such form that the spaced edges are for some distance in substantial parallelism, with the zone then narrowed down to zero gradually at one, or at both ends. In this manner the tendency of the flash zone to spread or contract due to varying across seam distances is entirely eliminated, and a predetermined zone of fairly constant dimensions and heating characteristics is maintained. It will be apparent that this operation may easily be obtained with either form of the invention herein illustrated. With the form illustrated, for example, in Figure 1, the initial roll pass and the roll pass provided by the auxiliary frame may be set to provide substantially the same internal diameter whereby the material in travelling from one roll pass to the other does not have the proximity of the edges varied. In travelling, however, from the intermediate carrier frame to the final roll pass, the edges are brought together.

With the form illustrated in Figure 8 of the invention the initial roll pass may be set so as not to bring the edges into actual contact, but to close them to the desired amount, and the rollers 118 set to maintain this relationship, the relative positions of the rolls 97 and 118 being adjusted so that a flash zone of the desired length and position in space is maintained. Thereafter in travelling from the rolls 118 to the rolls 97' the material may be brought together to establish the resistance heating zone. The obtaining of a flash zone of such type that the edges are in substantial parallelism may obviously result from any one of a large number of different forms of apparatus.

I have further found that with the housings spaced as shown more or less diagrammatically in Figure 28, it becomes possible to produce a type of flash zone, which is of fairly constant dimensions and heating characteristics, from pipe which is initially of more or less varying perimeter and contour, while at the same time the rolls 18 in the housing 3a are enabled to exert a very powerful feeding effort on this material M and hence propel it at a constant speed.

All these points constitute valuable commercial characteristics for any welder operating on heavy pipe. All the above results are produced by crushing the cold pipe to size in the housing 3a which takes so great a pressure that good driving traction on the pipe is necessarily obtained, permitting it to be driven forward at fairly constant speed in spite of the usual obstacles which produce varying speed effects in many other types of operation.

As this crushing is done outside the pole piece 31a it is purely mechanical, and has no effect on the electric or magnetic circuit of the machine.

Upon leaving the crushing rolls 18 in housing 3a the seam opens slowly until it reaches a maximum width and then converges again as the final closing rolls are approached. As this opening of the seam occurs after the crushing operation in the stiff housing 3a, such seam opening will be practically constant for sheets of a constant thickness and hardness of steel, irrespective of any moderate variations in the original width of plate from which the tube was formed.

If the maximum width of gap is held down well within the flashing distance for the voltage used, and the primary coil made so long as to lie under practically the whole length of the gap contour, then the full heating belt will be definitely determined, and the heat made nearly a constant, irrespective of any normal changes in pipe perimeter as the latter was originally formed. The "flash" area in the case of a "V" type seam is not so defined, since there is no precise limit to which the flame width will extend along the seam.

If the leaf-shaped type of seam heating area above mentioned is made rather narrow and long, it will be found that the percent of total turn voltage taken up by the metal of the pipe is increased, and that of the seam correspondingly decreased to a considerable extent, this tending toward better stabilization of the arc, and hence more nearly constant current conditions again aiding the desired constancy of the heating, while the excellent constancy of drive previously referred to further assists in the constancy of the total heating delivered to each unit of length of the seam.

I have throughout the specification referred to adjustments, pressures, frequencies, current inputs, speeds of travel and the like. In view of the present knowledge existing in the art with respect to welding operations, it is believed that the description herein contained is sufficient to enable one skilled in the art to practice my invention. In order, however, to make it easier to practice the invention and obviate entirely any necessity of extended experimentation, I shall give by way of example only, and not by way of any limitation, a specific set of conditions under which an apparatus in accordance with the disclosure of this application has been successfully operated. In such operation, the substantially tubular material was produced by forming up plates having a width of 62½ inches, and a thickness of approximately .375+ of an inch, the length of the plate varying in accordance with usual commercial practices. This material, although formed up by a cold forming operation in accordance with the disclosure of my application, Serial No. 365,323, might readily have been formed up in any other desired manner. As formed, it provided a substantially tubular body in which the edges were spaced a distance of approximately 1½ inches and having an external diameter including seam of approximately 20.8 inches, and an internal diameter of approximately 20.05 inches. With the form of my invention illustrated in Fig. 1, the initial roll pass was set to provide an internal diameter of approximately 20.33+ inches, whereby the edges were caused to move together considerably, reducing the gap therebetween to approximately .033 of an inch. Where a condition of substantial parallelism was desired between the edges, the rolls 26 were set to the same internal diameter as that afforded by the rolls 18 in the housing 3.

Under the conditions referred to, the rolls 18 of the housing 2 were set to afford an internal diameter of approximately 20 7/8 inches, this being sufficient to bring the edges into welding contact and to extrude the portion thereof heated to a dripping temperature and bring together those portions which have been heated to approximately a grain refining temperature, and thereby provide a weld having the characteristics of the nature herein described.

When operating under such conditions with a single internal primary coil, the coil had delivered thereto an input varying from 3400 kva. to 3800 kva., this having been effected with a primary voltage of approximately 850 volts and a current varying from 4000 amperes to 4500 amperes, at a frequency of 60 cycles. The k. w. input was around 2200 to 2500.

The material was fed through the welding apparatus at rates varying from 45 feet a minute to approximately 75 feet a minute, the higher speeds being within limits obtainable by using higher kva. input settings.

Under these conditions there was produced an article having a welded seam of greater strength and of better grain characteristics than that possessed by the remainder of the article, with a maximum heating adjacent the edges of the seam and almost entirely limited thereto. In the finished article the seam extended in an almost perfectly straight line from end to end except for short distances at the ends, was continuous from end to end, passed the A. P. I. specifications for hydrostatic pressures and was free from any great amount of camber from one end to the other.

While I have above given a specific example, it will be understood that the conditions are susceptible to variation in accordance with the characteristics of the material being formed, the cross sectional area thereof, the speeds at which it is desired to effect the welding, and the kva. input available.

While I have herein illustrated and described certain preferred embodiments of my invention, it will be apparent to those skilled in the art that the utility of the invention is not limited to the specific features of construction shown, and that changes in the construction and operation may be made without departing either from the spirit of the invention or the scope of my broader claims.

I claim:

1. In the method of progressive electric open seam heating, the steps comprising steadily bodily advancing substantially tubular open seam material to be longitudinally seam heated, crushing such tubular material to a substantially uniform perimeter to remove initial irregularities in plate width, and inducing periodically varying current peripherally around the material and once only across the very narrow but still slightly spaced portion of the converging seam for heating the seam edges to the required working temperature.

2. In the method of welding, the steps comprising continuously moving substantially tubular material to be welded, crushing such tubular material to a substantially uniform perimeter and producing a heating seam, causing the heating seam to open up to a substantially constant maximum limit value, and then to close again so as to form an elongated very narrow and substantially defined flash heating area.

3. In the method of welding, the steps comprising continuously moving substantially tubular material to be welded, crushing such tubular material to a substantially uniform perimeter, heating its seam by use of induced current, causing the heating seam to open up to a substantially constant maximum limit value, and then to close again so as to form an elongated very narrow and substantially defined steady flash heating area.

4. In the method of progressive electric induction open seam welding, the steps comprising progressive longitudinal bodily advance of an initially open seam substantially tubular body to be welded, the removal of spiralling of the seam remanent from the tube forming operation, the induction of heating current in a peripheral belt and predominantly in the inner surface layers around the tubular body, the conduction of such current through a forwardly offset path and once only across a minute vapor filled gap in the seam which remains substantially fixed in space as the tubular body advances for heating the opposed edge portions of said body to the required welding temperature in the vicinity of said vapor filled gap, and bringing the heated edges into welding contact under welding pressure.

5. In a method of electric induction welding, the steps comprising continuously moving a substantially tubular body to be welded, performing a crushing operation on said tubular body to obtain substantial uniformity of perimeter, and guiding said tubular body so as to produce a fairly well defined flash heating area of substantially constant contour and heating characteristics irrespective of the normal commercial variations in perimeter initially present along the said tubular body.

6. In a method of progressive electric induction flash heating, the steps comprising bodily progressively advancing a substantially tubular article to be longitudinally seam heated, so inducing a peripheral belt of heating current once around said article that it flows across a minute ionized-vapor filled heating gap in said seam, cleaning off the spittings thrown to the outside of said seam, and raising the opposing edges to the required working temperature simultaneously in time and longitudinal place with such cleaning off operation.

7. In a method of electric induction welding, the steps comprising continuously moving a substantially tubular body to be welded, crushing said body to substantially constant perimeter, providing a zone of longitudinal edge to edge contact, a heating zone of slight separation, and a final heating zone of intimate metallic contact in which the weld is effected.

8. In the method of progressive electric flash heating, the steps comprising progressively longitudinally bodily advancing very narrowly spaced opposing seam edges in one and the same direction, inducing heating current once across the ionized vapor filled gap between said progressing seam edges by two current zones displaced from one another longitudinally of said edges, and producing full normal inducing current flow in the primary current zone nearest the exit position after the trailing terminal ends of said two edges have partially passed beyond the primary current zone first reached in the travel of said edges.

9. In a progressive, electric, induction, seam heater, the combination with a heavy, entering, cold, tube-crushing and sizing-roll stand, of tube-advancing, power-driven feed means therefor, a power-driven, exit roll stand longitudinally spaced in the direction of tube travel from said crushing stand, said stands being effective for automatically opening up minutely the seam of the crushed tube therebetween, a primary coil positioned for magnetic linkage with the tube for inducing heating current once across the progressing minute opening between the opposed seam edges, and a source of inducing-current connected to said coil.

10. In an apparatus for progressive, electric, induction welding of longitudinal open seams in metal blanks, a progressive, seam-edge advancing means, a primary coil magnetically linking the seam edges for inducing heating current traversing said edges once, a source of energy connected to said coil, seam converging means bringing said edges into contact and then gradually into firmer and firmer pressure engagement as welding temperature is progressively attained in said edges, and material surface cleaning means effective before and during the application of welding pressure and along said seam.

11. In a method of progressive, electric welding, the steps comprising bodily advancing substantially tubular material with an open seam to be heated, causing a heating current to flow around a progressing peripheral belt in said material, and once across a progressing, narrow gap in said seam extending beyond the forward end of the current belt, bringing the two opposing edges into metallic engagement without interrupting the heating current flow, increasing the contact pressure gradually during such heating current flow, extruding the softer metal parts first brought into contact at the seam, and cleaning off a portion of the extruded materials simultaneously with the heating operation.

12. In a method of progressive, electric welding, the steps comprising advancing a substantially tubular article having an open seam to be welded, crushing and sizing the advancing article, converging the edges of the seam into final contact, causing a peripheral heating current to flow around said tubular article partly across the open seam and partly across the closed seam beyond the point of final contact, to heat the edges to welding temperature thereby, and then applying pressure to complete the weld.

13. In a progressive, electric, seam welding apparatus, means for advancing opposed seam edges longitudinally in slightly spaced relation, means for crushing and sizing the advancing edges, means for converging the seam edges, a primary coil for inducing heating current, said coil being so placed relative to the converging means as to cause the current to flow partly across the narrow gap between seam edges through ionized vapor, and partly across the abutting seam edges after convergence into contact, and means for applying welding pressure to the edges.

14. In a method of welding the edges of a longitudinal seam cleft in a formed-up tube blank, the steps comprising advancing the blank axially with opposed seam edges in slightly spaced relation, causing a heating-current to flow across the cleft of the blank, said current tending to repel said edges bodily outward, and applying pressure to the edges to oppose said repulsion and maintain the gap spacing within flashing distance regardless thereof.

15. The method of making metal pipe which includes the steps of cold working the seam edges of a ferrous metal pipe blank having a longitudinally extending seam to shape the seam edges for welding and then welding the seam edges together by passing welding current across the seam and pressing the edges together with welding pressure.

16. The method of making metal pipe which includes the steps of cold-working the seam edges of a ferrous metal pipe blank having a longitudinally extending seam, by pressing such edges against each other with cold metal working pressure, and then welding the seam edges together by passing welding current across the seam and pressing the edges together with welding pressure.

17. Apparatus for making metal pipe which includes means for propelling lengthwise a ferrous metal pipe blank having a longitudinally extending seam, means for cold working the opposed edges of the seam, said means including members engageable with the exterior of the blank, and a welding throat including means engageable with the exterior of the blank for pressing the seam edges together with welding pressure while at welding temperature.

18. A machine for welding an initially open longitudinal seam cleft in a pipe blank, comprising in combination, a frame, electro-inductive means comprising a plurality of parallel connected windings disposed in inductive relation to said pipe blank, to produce different succeeding stages of the welding operation, support means carried by the frame and positioned in the longitudinal seam cleft thereof for mounting said electro-inductive means within said pipe blank, and means for moving said pipe blank relative to said electro-inductive means.

19. In a machine for making welded seamless pipe, conduit and the like, in combination with a power driven roll stand for feeding open seam pipe or conduit, a roll stand through which said pipe is fed, means for heating the open seam of said pipe or conduit by electromagnetic induction to welding or fusing temperature as it leaves said second-mentioned roll stand, means for scavenging the heated or fused seam as the pipe leaves the heating means, and a power driven roll stand through which the pipe passes for rolling and crushing the heated scavenged seam to complete the welding thereof.

20. In a machine for making welded seamless pipe, conduit and the like, in combination with a power driven roll stand for feeding open seam pipe or conduit, an idle roll stand through which said pipe is fed, means for heating the open seam of said pipe or conduit by electromagnetic induction to welding or fusing temperature as it leaves the idle roll stand, means for cleaning the heated seam as it leaves the heating means, and a power driven roll stand through which the pipe passes for rolling and crushing the heated seam to complete the welding thereof.

21. The method of welding open seam pipe that consists in progressively applying pressure to successive portions of the pipe so as to progressively close the seam from one end of the pipe to the other, subjecting successive portions of said pipe to the effect of an electro-magnetic inductive means whereby currents of electricity are caused to flow across the point of contact of the seam edges as the seam is progressively closed, whereby the seam edges are progressively heated to welding or fusing temperature from one end of the pipe to the other, and then in rolling the fused seam edges to thereby weld them together.

22. In a welding apparatus, a housing, a plurality of rolls therein, means for rotating said rolls, and intergeared eccentric sleeves cooperating with said rolls for effecting adjustment thereof inwardly or outwardly relative to a substantially common axis.

23. In an electric welding apparatus, means for cold crushing a formed-up metal tube to an approximately constant perimeter, means providing a flash heating zone along the seam of said tube, means for moving said tube longitudinally, and means for so inducing the necessary heating energy in said flash zone as to cause the latter to progress backward counter to the direction of tube motion and at approximately the same velocity.

24. In a welding apparatus, a housing, a plurality of pressure rolls journaled therein, means for rotating at least one of said rolls, and means for simultaneously adjusting part of said rolls toward or from a substantially common axis, said rolls at one point in the housing being out of contact one with the other to provide a break in the metallic electric circuit otherwise established thereby.

JAMES L. ADAMS, Jr.

CERTIFICATE OF CORRECTION.

Patent No. 2,335,894.  December 7, 1943.

JAMES L. ADAMS, JR.

It is hereby certified that error appears in the printed specification of the above numbered patent requiring correction as follows: Page 3, second column, line 69, for "removable" read --removal--; page 11, first column, line 32, for "17 and 22" read --17 and 23--; page 13, first column, line 49, for "ridge" read --ridges--; page 14, first column, line 27, for "th" read --the--; and that the said Letters Patent should be read with this correction therein that the same may conform to the record of the case in the Patent Office.

Signed and sealed this 8th day of February, A. D. 1944.

(Seal)  Henry Van Arsdale,
Acting Commissioner of Patents.